(12) United States Patent
Leong et al.

(10) Patent No.: US 9,761,389 B2
(45) Date of Patent: *Sep. 12, 2017

(54) LOW-TRAVEL KEY MECHANISMS WITH BUTTERFLY HINGES

(71) Applicant: Apple Inc., Cupertino, CA (US)

(72) Inventors: Craig C. Leong, Cupertino, CA (US); James J. Niu, Cupertino, CA (US); John M. Brock, Cupertino, CA (US); Keith J. Hendren, Cupertino, CA (US); Thomas W. Wilson, Jr., Cupertino, CA (US); Bruce E. Berg, Cupertino, CA (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/264,827

(22) Filed: Sep. 14, 2016

(65) Prior Publication Data

US 2017/0004937 A1    Jan. 5, 2017

Related U.S. Application Data

(63) Continuation of application No. 14/058,448, filed on Oct. 21, 2013, now Pat. No. 9,449,772.

(Continued)

(51) Int. Cl.
*H01H 13/14* (2006.01)
*G06F 3/02* (2006.01)
(Continued)

(52) U.S. Cl.
CPC ........... *H01H 13/14* (2013.01); *G06F 3/0202* (2013.01); *G06F 3/0238* (2013.01); *H01H 11/00* (2013.01);
(Continued)

(58) Field of Classification Search
CPC ..... G06F 3/0238; G06F 3/0202; H01H 13/14; H01H 11/00; H01H 13/70; H01H 13/705;
(Continued)

(56) References Cited

U.S. PATENT DOCUMENTS 3,657,492 A    4/1972  Arndt et al.
3,917,917 A   11/1975  Murata
(Continued)

FOREIGN PATENT DOCUMENTS

CN    2155620    2/1994
CN    2394309    8/2000
(Continued)

OTHER PUBLICATIONS

Elekson, "Reliable and Tested Wearable Electronics Embedment Solutions," http://www.wearable.technology/our-technologies, 3 pages, at least as early as Jan. 6, 2016.
(Continued)

*Primary Examiner* — Edwin A. Leon
(74) *Attorney, Agent, or Firm* — Brownstein Hyatt Farber Schreck, LLP

(57) ABSTRACT

A key mechanism can include one or more butterfly hinges. Each butterfly hinge includes a double wing design operative to move between a depressed position and non-depressed position. Hinged coupling mechanisms couple respective arms of the wings together.

19 Claims, 28 Drawing Sheets

Related U.S. Application Data

(60) Provisional application No. 61/720,373, filed on Oct. 30, 2012.

(51) Int. Cl.

| | | |
|---|---|---|
| *G06F 3/023* | (2006.01) | |
| *H01H 13/705* | (2006.01) | |
| *H01H 11/00* | (2006.01) | |
| *H01H 13/70* | (2006.01) | |
| *H01H 3/12* | (2006.01) | |

(52) U.S. Cl.
CPC .......... *H01H 13/70* (2013.01); *H01H 13/705* (2013.01); *H01H 3/122* (2013.01); *H01H 2227/028* (2013.01); *H01H 2227/036* (2013.01); *H01H 2237/00* (2013.01)

(58) Field of Classification Search
CPC ............. H01H 3/122; H01H 2227/028; H01H 2227/036; H01H 2237/00
USPC ....... 200/344, 341, 310, 314, 313, 292, 406, 200/412, 516
See application file for complete search history.

(56) References Cited

U.S. PATENT DOCUMENTS

| | | | |
|---|---|---|---|
| 3,978,297 A | 8/1976 | Lynn et al. | |
| 4,095,066 A | 6/1978 | Harris | |
| 4,319,099 A | 3/1982 | Asher | |
| 4,349,712 A | 9/1982 | Michalski | |
| 4,484,042 A | 11/1984 | Matsui | |
| 4,598,181 A | 7/1986 | Selby | |
| 4,670,084 A | 6/1987 | Durand et al. | |
| 4,755,645 A | 7/1988 | Naoki et al. | |
| 4,937,408 A | 6/1990 | Hattori et al. | |
| 5,021,638 A | 6/1991 | Nopper et al. | |
| 5,092,459 A | 3/1992 | Uljanic et al. | |
| 5,136,131 A | 8/1992 | Komaki | |
| 5,278,372 A | 1/1994 | Takagi et al. | |
| 5,280,146 A | 1/1994 | Inagaki et al. | |
| 5,340,955 A | 8/1994 | Calvillo et al. | |
| 5,382,762 A | 1/1995 | Mochizuki | |
| 5,421,659 A | 6/1995 | Liang | |
| 5,422,447 A | 6/1995 | Spence | |
| 5,457,297 A | 10/1995 | Chen | |
| 5,477,430 A | 12/1995 | LaRose et al. | |
| 5,481,074 A | 1/1996 | English | |
| 5,504,283 A | 4/1996 | Kako et al. | |
| 5,512,719 A | 4/1996 | Okada et al. | |
| 5,625,532 A | 4/1997 | Sellers | |
| 5,804,780 A | 9/1998 | Bartha | |
| 5,828,015 A | 10/1998 | Coulon | |
| 5,847,337 A | 12/1998 | Chen | |
| 5,874,700 A | 2/1999 | Hochgesang | |
| 5,876,106 A | 3/1999 | Kordecki et al. | |
| 5,878,872 A | 3/1999 | Tsai | |
| 5,881,866 A | 3/1999 | Miyajima et al. | |
| 5,935,691 A | 8/1999 | Tsai | |
| 5,986,227 A | 11/1999 | Hon | |
| 6,020,565 A | 2/2000 | Pan | |
| 6,215,420 B1 | 4/2001 | Harrison et al. | |
| 6,257,782 B1 | 7/2001 | Maruyama et al. | |
| 6,377,685 B1 | 4/2002 | Krishnan | |
| 6,388,219 B2 | 5/2002 | Hsu et al. | |
| 6,482,032 B1 | 11/2002 | Szu et al. | |
| 6,530,283 B2 | 3/2003 | Okada et al. | |
| 6,538,801 B2 | 3/2003 | Jacobson et al. | |
| 6,542,355 B1 | 4/2003 | Huang | |
| 6,552,287 B2 | 4/2003 | Janniere | |
| 6,556,112 B1 | 4/2003 | Van Zeeland et al. | |
| 6,559,399 B2 | 5/2003 | Hsu et al. | |
| 6,572,289 B2 | 6/2003 | Lo et al. | |
| 6,573,463 B2 | 6/2003 | Ono | |
| 6,585,435 B2 | 7/2003 | Fang | |
| 6,624,369 B2 | 9/2003 | Ito et al. | |
| 6,706,986 B2 | 3/2004 | Hsu | |
| 6,750,414 B2 | 6/2004 | Sullivan | |
| 6,759,614 B2 | 7/2004 | Yoneyama | |
| 6,762,381 B2 | 7/2004 | Kunthady et al. | |
| 6,788,450 B2 | 9/2004 | Kawai et al. | |
| 6,797,906 B2 | 9/2004 | Ohashi | |
| 6,850,227 B2 | 2/2005 | Takahashi et al. | |
| 6,860,660 B2 | 3/2005 | Hochgesang et al. | |
| 6,926,418 B2 | 8/2005 | Östergård et al. | |
| 6,940,030 B2 | 9/2005 | Takeda et al. | |
| 6,977,352 B2 | 12/2005 | Oosawa | |
| 6,979,792 B1 | 12/2005 | Tsai | |
| 6,987,466 B1 | 1/2006 | Welch et al. | |
| 6,987,503 B2 | 1/2006 | Inoue | |
| 7,012,206 B2 | 3/2006 | Oikawa | |
| 7,038,832 B2 | 5/2006 | Kanbe | |
| 7,126,499 B2 | 10/2006 | Lin et al. | |
| 7,129,930 B1 | 10/2006 | Cathey et al. | |
| 7,134,205 B2 | 11/2006 | Bruennel | |
| 7,146,701 B2 | 12/2006 | Mahoney et al. | |
| 7,151,236 B2 | 12/2006 | Ducruet et al. | |
| 7,151,237 B2 | 12/2006 | Mahoney et al. | |
| 7,154,059 B2 | 12/2006 | Chou | |
| 7,166,813 B2 | 1/2007 | Soma | |
| 7,172,303 B2 | 2/2007 | Shipman et al. | |
| 7,189,932 B2 | 3/2007 | Kim | |
| 7,256,766 B2 | 8/2007 | Albert et al. | |
| 7,283,119 B2 | 10/2007 | Kishi | |
| 7,301,113 B2 | 11/2007 | Nishimura et al. | |
| 7,378,607 B2 | 5/2008 | Koyano et al. | |
| 7,414,213 B2 | 8/2008 | Hwang | |
| 7,429,707 B2 | 9/2008 | Yanai et al. | |
| 7,432,460 B2 | 10/2008 | Clegg | |
| 7,510,342 B2 | 3/2009 | Lane et al. | |
| 7,531,764 B1 | 5/2009 | Lev et al. | |
| 7,541,554 B2 | 6/2009 | Hou | |
| 7,639,187 B2 | 12/2009 | Caballero et al. | |
| 7,679,010 B2 | 3/2010 | Wingett | |
| 7,781,690 B2 | 8/2010 | Ishii | |
| 7,813,774 B2 | 10/2010 | Perez-Noguera | |
| 7,842,895 B2 | 11/2010 | Lee | |
| 7,847,204 B2 | 12/2010 | Tsai | |
| 7,851,819 B2 | 12/2010 | Shi | |
| 7,866,866 B2 | 1/2011 | Wahlstrom | |
| 7,893,376 B2 | 2/2011 | Chen | |
| 7,923,653 B2 | 4/2011 | Ohsumi | |
| 7,947,915 B2 | 5/2011 | Lee et al. | |
| 7,999,748 B2 | 8/2011 | Ligtenberg et al. | |
| 8,063,325 B2 | 11/2011 | Sung et al. | |
| 8,080,744 B2 | 12/2011 | Yeh et al. | |
| 8,109,650 B2 | 2/2012 | Chang et al. | |
| 8,119,945 B2 | 2/2012 | Lin | |
| 8,124,903 B2 | 2/2012 | Tatehata et al. | |
| 8,134,094 B2 | 3/2012 | Tsao et al. | |
| 8,143,982 B1 | 3/2012 | Lauder et al. | |
| 8,156,172 B2 | 4/2012 | Muehl et al. | |
| 8,178,808 B2 | 5/2012 | Strittmatter et al. | |
| 8,212,160 B2 | 7/2012 | Tsao | |
| 8,212,162 B2 | 7/2012 | Zhou | |
| 8,218,301 B2 | 7/2012 | Lee | |
| 8,232,958 B2 | 7/2012 | Tolbert | |
| 8,246,228 B2 | 8/2012 | Ko et al. | |
| 8,253,048 B2 | 8/2012 | Ozias et al. | |
| 8,253,052 B2 | 8/2012 | Chen | |
| 8,263,887 B2 | 9/2012 | Chen et al. | |
| 8,289,280 B2 | 10/2012 | Travis | |
| 8,299,382 B2 | 10/2012 | Takemae et al. | |
| 8,317,384 B2 | 11/2012 | Chung et al. | |
| 8,319,298 B2 | 11/2012 | Hsu | |
| 8,325,141 B2 | 12/2012 | Marsden | |
| 8,330,725 B2 | 12/2012 | Mahowald et al. | |
| 8,354,629 B2 | 1/2013 | Lin | |
| 8,378,857 B2 | 2/2013 | Pance | |
| 8,383,972 B2 | 2/2013 | Liu | |
| 8,384,566 B2 | 2/2013 | Bocirnea | |
| 8,404,990 B2 | 3/2013 | Lutgring et al. | |
| 8,431,849 B2 | 4/2013 | Chen | |
| 8,436,265 B2 | 5/2013 | Koike et al. | |

(56) References Cited

U.S. PATENT DOCUMENTS

| | | |
|---|---|---|
| 8,451,146 B2 | 5/2013 | Mahowald et al. |
| 8,462,514 B2 | 6/2013 | Myers et al. |
| 8,500,348 B2 | 8/2013 | Dumont et al. |
| 8,502,094 B2 | 8/2013 | Chen |
| 8,542,194 B2 | 9/2013 | Akens et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,651,720 B2 | 2/2014 | Sherman et al. |
| 8,659,882 B2 | 2/2014 | Liang et al. |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1 | 12/2014 | Hyman |
| 8,922,476 B2 | 12/2014 | Stewart et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,024,214 B2 | 5/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,405,369 B2 | 8/2016 | Modarres et al. |
| 9,412,533 B2 | 8/2016 | Hendren et al. |
| 9,443,672 B2 | 9/2016 | Martisauskas |
| 9,448,628 B2 | 9/2016 | Tan et al. |
| 9,448,631 B2 | 9/2016 | Winter et al. |
| 9,449,772 B2 * | 9/2016 | Leong ............... G06F 3/0202 |
| 9,471,185 B2 | 10/2016 | Guard |
| 9,502,193 B2 | 11/2016 | Niu et al. |
| 2002/0079211 A1 | 6/2002 | Katayama et al. |
| 2002/0093436 A1 | 7/2002 | Lien |
| 2002/0149835 A1 | 10/2002 | Kanbe |
| 2003/0169232 A1 | 9/2003 | Ito |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2010/0066568 A1 | 3/2010 | Lee |
| 2010/0156796 A1 | 6/2010 | Kim et al. |
| 2010/0253630 A1 | 10/2010 | Homma et al. |
| 2011/0032127 A1 | 2/2011 | Roush |
| 2011/0056817 A1 | 3/2011 | Wu |
| 2011/0056836 A1 | 3/2011 | Tatebe et al. |
| 2011/0205179 A1 | 8/2011 | Braun |
| 2011/0267272 A1 | 11/2011 | Meyer et al. |
| 2012/0012446 A1 | 1/2012 | Hwa |
| 2012/0090973 A1 | 4/2012 | Liu |
| 2012/0098751 A1 | 4/2012 | Liu |
| 2012/0286701 A1 | 11/2012 | Yang et al. |
| 2012/0298496 A1 | 11/2012 | Zhang |
| 2012/0313856 A1 | 12/2012 | Hsieh |
| 2013/0093500 A1 | 4/2013 | Bruwer |
| 2013/0100030 A1 | 4/2013 | Los et al. |
| 2013/0120265 A1 | 5/2013 | Horii et al. |
| 2013/0215079 A1 | 8/2013 | Johnson et al. |
| 2013/0270090 A1 | 10/2013 | Lee |
| 2014/0015777 A1 | 1/2014 | Park et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0118264 A1* | 5/2014 | Leong ............... G06F 3/0202 |
| | | 345/168 |
| 2014/0151211 A1 | 6/2014 | Zhang |
| 2014/0191973 A1 | 7/2014 | Zellers et al. |
| 2014/0218851 A1 | 8/2014 | Klein et al. |
| 2014/0252881 A1 | 9/2014 | Dinh et al. |
| 2014/0291133 A1 | 10/2014 | Fu et al. |
| 2014/0375141 A1 | 12/2014 | Nakajima |
| 2015/0016038 A1 | 1/2015 | Niu et al. |
| 2015/0083561 A1 | 3/2015 | Han et al. |
| 2015/0090570 A1 | 4/2015 | Kwan et al. |
| 2015/0090571 A1* | 4/2015 | Leong ............... H01H 13/83 |
| | | 200/5 A |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |
| 2015/0309538 A1 | 10/2015 | Zhang |
| 2015/0332874 A1 | 11/2015 | Brock et al. |
| 2015/0348726 A1 | 12/2015 | Hendren |
| 2015/0370339 A1 | 12/2015 | Ligtenberg et al. |
| 2015/0378391 A1 | 12/2015 | Huitema et al. |
| 2016/0049266 A1 | 2/2016 | Stringer et al. |
| 2016/0093452 A1 | 3/2016 | Zercoe et al. |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0336124 A1 | 11/2016 | Leong et al. |
| 2016/0336127 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |
| 2016/0378234 A1 | 12/2016 | Ligtenberg et al. |
| 2016/0379775 A1 | 12/2016 | Leong et al. |
| 2017/0004939 A1 | 1/2017 | Kwan et al. |
| 2017/0011869 A1 | 1/2017 | Knopf et al. |
| 2017/0090106 A1 | 3/2017 | Cao et al. |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1855332 | 11/2006 |
| CN | 101051569 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101465226 | 6/2009 |
| CN | 101494130 | 7/2009 |

(56) References Cited

FOREIGN PATENT DOCUMENTS

| | | |
|---|---|---|
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102629526 | 8/2012 |
| CN | 202372927 | 8/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 103681056 | 3/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| EP | 0441993 | 8/1991 |
| EP | 1835272 | 9/2007 |
| EP | 1928008 | 6/2008 |
| EP | 2202606 | 6/2010 |
| EP | 2426688 | 3/2012 |
| EP | 2439760 | 4/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S61172422 | 10/1986 |
| JP | S62072429 | 4/1987 |
| JP | S63182024 | 11/1988 |
| JP | H0422024 | 4/1992 |
| JP | H0520963 | 1/1993 |
| JP | H0524512 | 8/1993 |
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011065126 | 3/2011 |
| JP | 2011150804 | 8/2011 |
| JP | 2011165630 | 8/2011 |
| JP | 2011524066 | 8/2011 |
| JP | 2012043705 | 3/2012 |
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014216190 | 11/2014 |
| JP | 2014220039 | 11/2014 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

OTHER PUBLICATIONS

International Search Report, PCT/US2013/066009, 4 pages, Dec. 12, 2013.

(56) References Cited

OTHER PUBLICATIONS

Invitation to Pay Additional Fees, PCT/US2014/052237, 7 pages, Jan. 9, 2015.

* cited by examiner

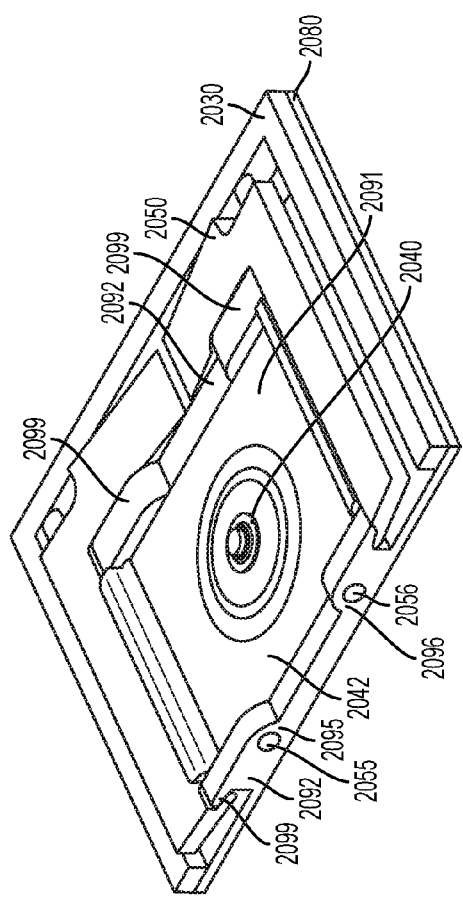
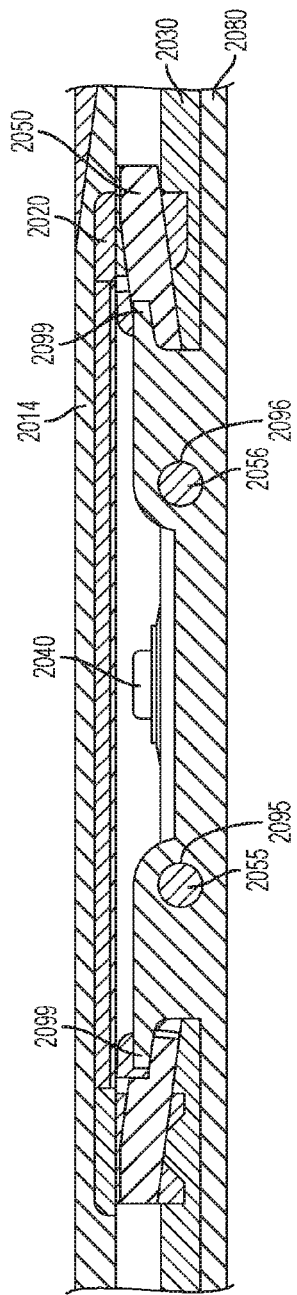
FIG. 24
FIG. 25

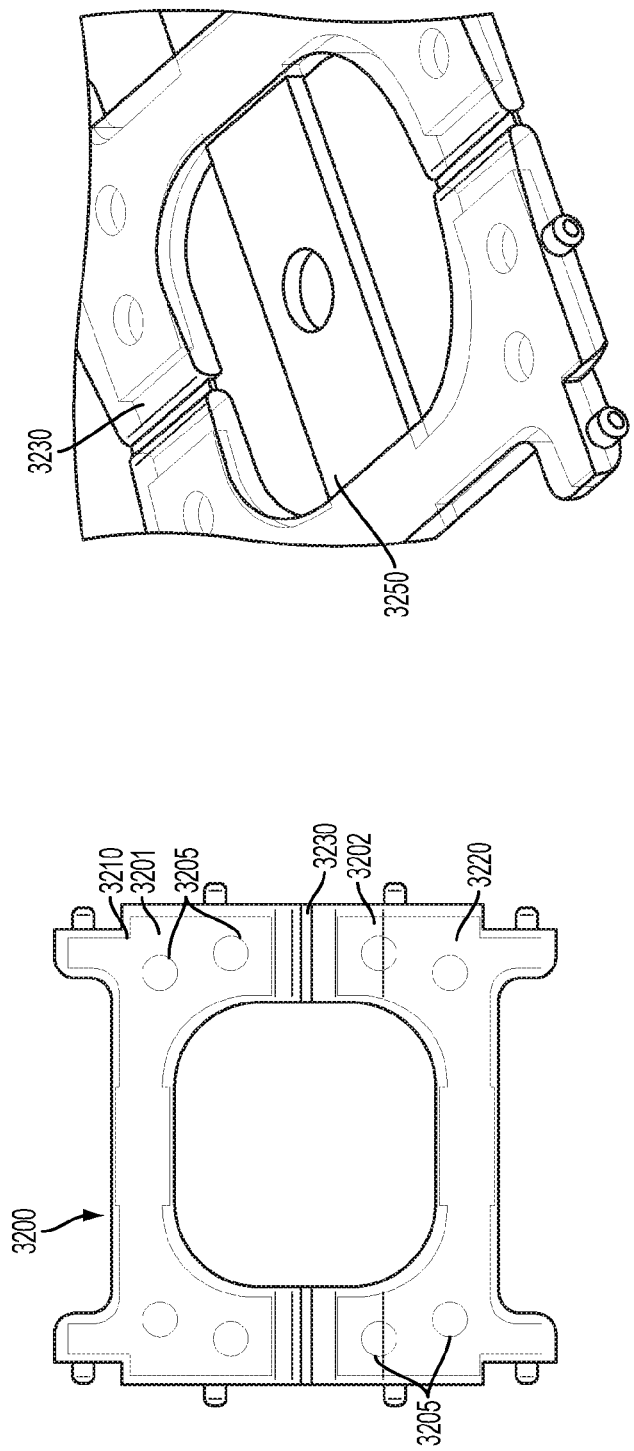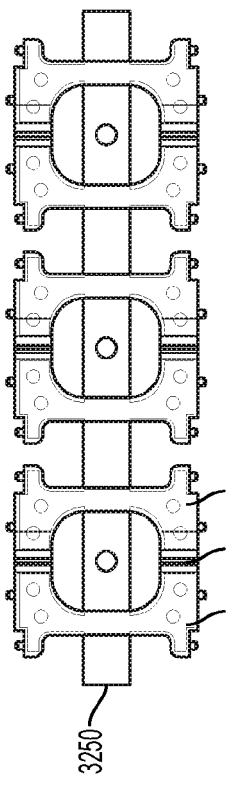
FIG. 32B
FIG. 32C
FIG. 32A

LOW-TRAVEL KEY MECHANISMS WITH BUTTERFLY HINGES

CROSS-REFERENCE TO RELATED APPLICATIONS

This application is a continuation patent application of U.S. patent application Ser. No. 14/058,448, filed Oct. 21, 2013 and titled "Low-Travel Key Mechanisms Using Butterfly Hinges," which is a nonprovisional patent application of and claims the benefit of U.S. Provisional Patent Application No. 61/720,373, filed Oct. 30, 2012 and titled "Low-Travel Key Mechanisms Using Butterfly Hinges," the disclosures of which are hereby incorporated herein by reference in their entireties.

TECHNICAL FIELD

The disclosed embodiments relate generally to electronic devices, and more particularly to input devices for electronic devices.

BACKGROUND

Many electronic devices typically include one or more input devices such as keyboards, touchpads, mice, or touchscreens to enable a user to interact with the device. These devices can be integrated into an electronic device or can stand alone as discrete devices that can transmit signals to another device either via wired or wireless connection. For example, a keyboard can be integrated into the housing of a laptop computer or it can exist in its own housing.

It is often desirable to reduce the size of electronic devices and minimize machining costs and manufacturing time of such devices. For example, laptops may be designed to be as small and light as possible, but input devices such as a keyboard may occupy relatively large portions of the available interior space. One way to alleviate design constrains of a keyboard is to minimize the z-stackup of key mechanisms. Accordingly, what is needed is an improved key mechanism design.

SUMMARY

In one aspect, a key mechanism includes a butterfly hinge. The butterfly hinged key mechanism according to various embodiments enable substantially low travel distances with desired tactile response. The key mechanism uses a double wing design operative to move between a depressed position and non-depressed position. In one embodiment, a key mechanism includes a keycap assembly, a support structure, and a butterfly hinge having two independently articulating wings, each wing coupled to the keycap assembly and the support structure, wherein each wing is operative to pivot about its own pivot axis during a keystroke of the key mechanism.

In another aspect, a key mechanism includes a keycap assembly, a support structure, and a butterfly hinge that includes two separate wings positioned adjacent to each other such that a cavity is formed between the two wings. Each wing can include a pair of pivot pins and a pair of keycap assembly pins, where the pivot pins are coupled to the support structure and the keycap assembly pins are coupled to the keycap assembly. In addition, a switch, such as a dome switch, can be secured within the cavity between the keycap assembly and the support structure. The switch is operative to bias the keycap assembly in a first position. For example, the switch can bias the keycap assembly upwards when the key mechanism is not subjected to a keystroke event.

In another aspect, a key mechanism includes a keycap assembly and a carrier structure that includes a plate and arms fixed to opposite ends of the plate. Each arm can include pivot pin retaining members. A butterfly hinge includes two separate wings positioned adjacent to each other, each wing comprising a pair of pivot pins and a pair of keycap assembly pins. The pivot pins are coupled to the carrier structure and the keycap assembly pins are coupled to the keycap assembly. The carrier structure can house an electronics package that includes circuitry such as a switch, light source, or a display.

In another aspect, a butterfly assembly can include first and second wings, each wing comprising a pair of pivot pins and a pair of keycap assembly pins. The pins of each pair are coaxially aligned with their own respective pair axis. First and second hinges couple the first and second wings together. A cavity is formed between the first and second wings when the wings are hinged together.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 24 shows an illustrative perspective view of a key mechanism in accordance with an embodiment;

FIG. 25 shows an illustrative cross-sectional view of key mechanism in accordance to an embodiment;

FIGS. 32A-32C show illustrative views of a butterfly hinge in accordance with an embodiment.

DETAILED DESCRIPTION

Some embodiments described herein provide a key mechanism for an input device such as a keyboard that includes a butterfly hinge. The butterfly hinged key mechanism can enable substantially low travel distances with desired tactile response. For example, a butterfly hinged key mechanism can enable keystrokes ranging between 0.1 mm to 2.0 mm, and in some embodiments, the keystroke can be 0.5 mm or 0.75 mm. The key mechanism uses a double wing design operative to move between a depressed position and non-depressed position. Corresponding arms of the butterfly hinge are coupled together with coupling mechanisms. The coupling mechanisms can be, for example, a flexible or living hinge or a gear hinge. The wings of the butterfly hinge articulate independently with each wing operative to pivot about its own pivot axis during a keystroke of the key mechanism.

Figure 1:
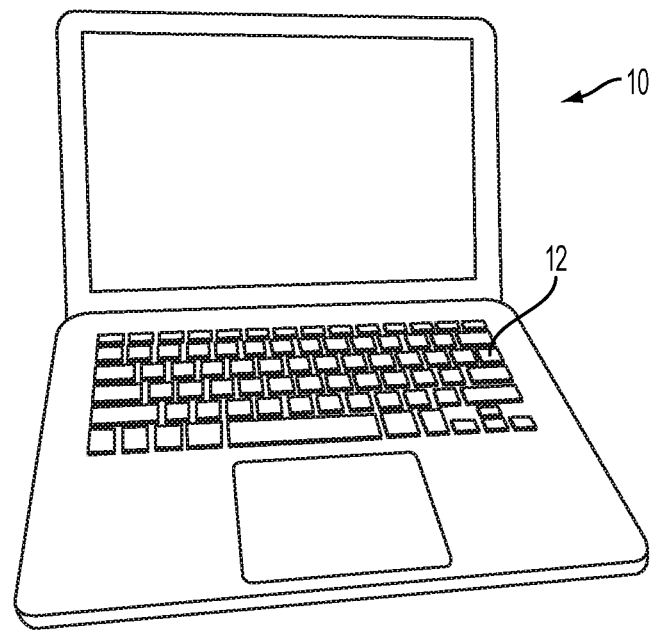
FIG. 1 shows a perspective view of a computing device having a keyboard incorporated therein in accordance with an embodiment.

FIG. 1 shows a perspective view of a computing device 10 having a keyboard 12 incorporated therein. Computing device 10 can be any suitable computing device, such as, for example, a laptop computer, a desktop computer, a telephone, smart phone, or gaming device. Keyboard 12 can be integrally formed within computing device 10. In other embodiments, a keyboard according to an embodiment can be separate from the computing device and can stand alone as a self-contained device. For example, a keyboard may be a communication interface such as, for example, a wired keyboard or a wireless keyboard that can transmit data to and from a computing device.

Figure 2:
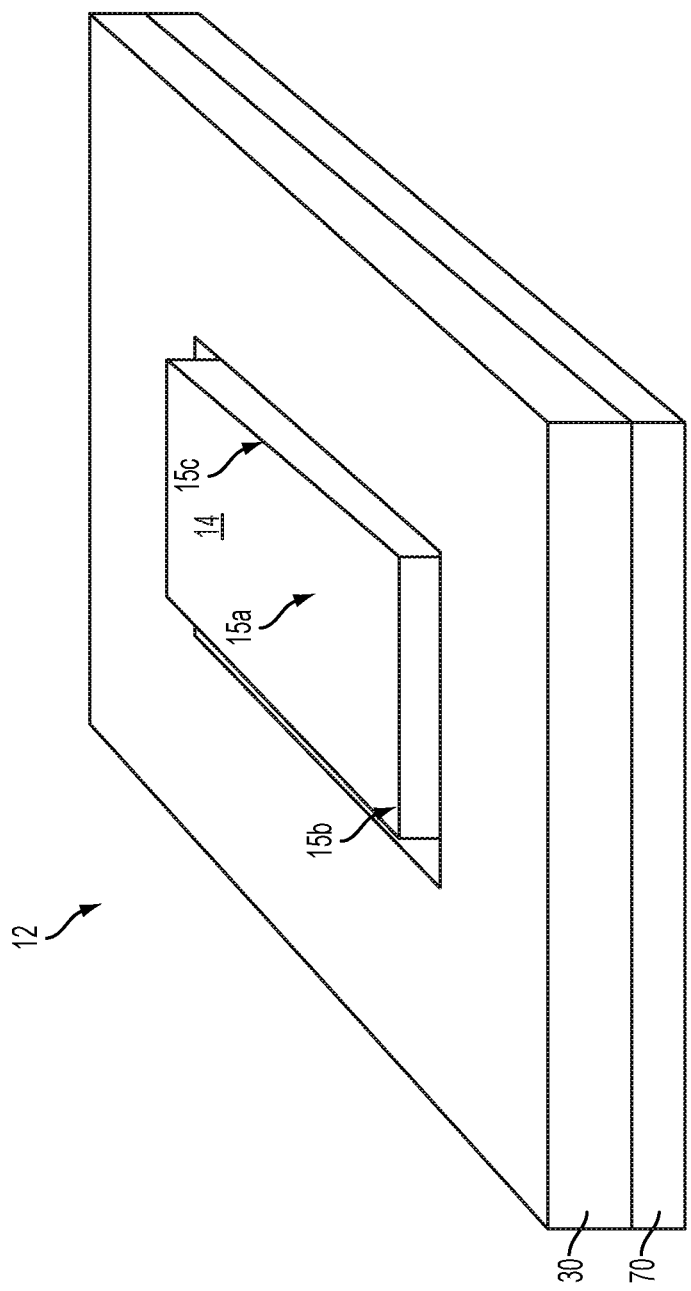
FIG. 2 shows an illustrative perspective view of a section of a keyboard in accordance with an embodiment.

FIG. 2 shows an illustrative perspective view of a section of keyboard 12 (shown as element 12) including a key 14. FIG. 2 also shows a stackup of web 30 and support structure 70. Web 30 can be a skeletal structure that surrounds each key of keyboard 10 and provides structural and cosmetic attributes to keyboard 10. Web 30 can be secured to support structure 70 using any suitable approach such as, for example, by adhesive, glue, weld, pins, interface fits, or any combination thereof. Support structure 70 can provide the platform for components contained within a keyboard. Support structure 70 is sometimes referred to as a feature plate. As defined herein, support structure 70 can include any combination of a feature plate, circuit board, and retaining mechanisms for use in various keyboard mechanism embodiments.

Key mechanisms according to various embodiments discussed herein provide a substantially low travel keystroke while maintaining a desired tactile feel over the lifetime of the keyboard. Decreasing the keystroke distance enables keyboard 10 to be built thinner than contemporary keyboards. For example, key mechanisms according to various embodiments described herein can enable keystrokes ranging between 0.1 mm to 2.0 mm, and in some particular embodiments, the keystroke can be 0.5 mm or 0.75 mm.

The tactile performance of the key mechanism is consistent regardless of where a user presses down on key 14. That is, the tactile response of key 14 is substantially the same if the user pressed down at the center (at region 15a), the corner (at region 15b), or the edge (at region 15c) of key 14. In addition to having a uniform tactile response, the movement of key 14 during a keystroke is also uniform regardless of where it is depressed. For example, imagine a reference plane exists at the top surface of key 14. When key 14 is pressed at region 15a, its movement is one in which the top planar surface of key 14 remains parallel to the reference plane throughout the keystroke. The same is true when key 14 is depressed at a corner or edge; the top planar surface remains parallel or substantially parallel to the reference plane throughout the keystroke. Maintaining this parallel movement, with a relatively low travel, and desired tactile response, is accomplished using a butterfly hinge mechanism according to various embodiments.

Figure 3:
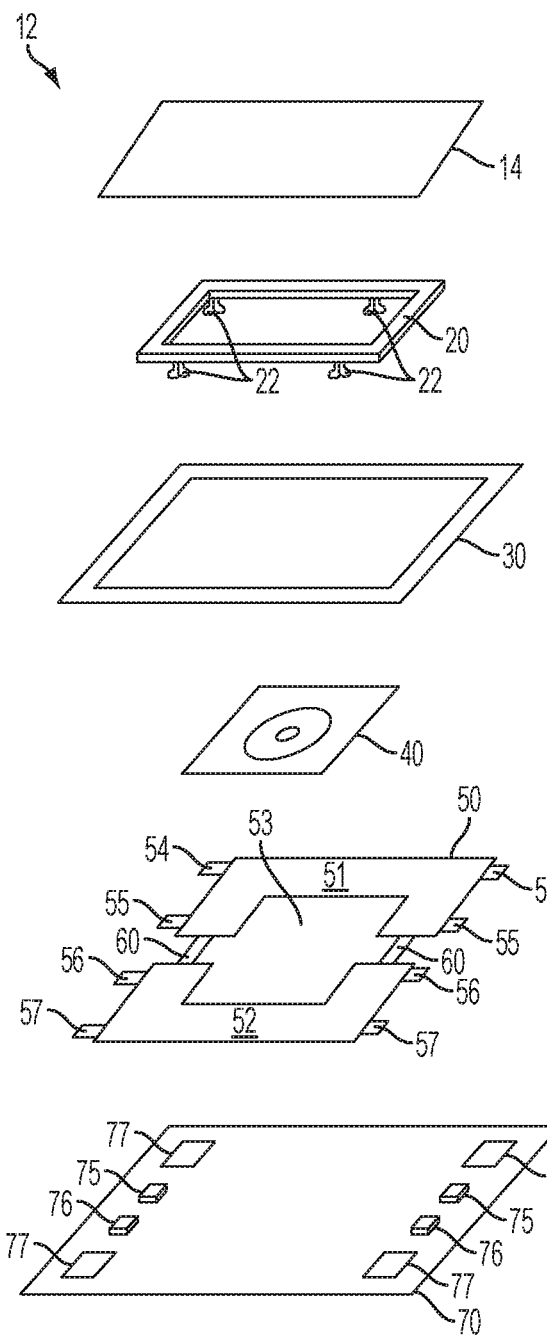
FIG. 3 shows a generic and illustrative exploded view of a key mechanism in accordance with an embodiment.

Referring now to FIG. 3, a generic and illustrative exploded view of key mechanism 12 is shown. Reference will also be made to FIGS. 4-5 to assist in the description of how key mechanism 12 operates. Key mechanism 12 can include keycap 14, substructure 20, web 30, switch 40, butterfly hinge 50, and support structure 70. Assembly of key mechanism is as follows. Keycap 14 is secured to substructure 20 to form a keycap assembly. The keycap assembly can fit within the inner perimeter of web 30, and web 30 is secured to an outer boundary of support structure 70. In other embodiments, the keycap assembly can exist above web 30. Butterfly hinge 50 is secured to substructure 20 and support structure 70, and is also contained within the inner perimeter of web 30. Switch 40 resides within cavity 53 of butterfly hinge 50 and can be secured to either the keycap assembly or support structure 70.

Keycap 14 is the portion of key mechanism that a user depresses during a keystroke. Keycap 14 can take any suitable shape and can be constructed from any suitable material. For example, keycap 14 can be constructed from plastic, glass, or metal. In some embodiments, keycap 14 can be constructed from a translucent material so that a backlight can shine through. Moreover, a translucent keycap can be masked so that it displays a character.

Substructure 20 can take any suitable shape and be constructed from any suitable material. Substructure 20 can fulfill several different functions in its use in key mechanism. In one function, it provides pin retaining mechanisms 22 for coupling to butterfly hinge 50. In particular, substructure can include four pin retaining mechanisms 22, each one operative to couple to one of keycap assembly pins 54 and 57 of butterfly hinge 50. Additional details of pin retaining mechanisms 22 are discussed in more detail below.

As another function, substructure 20 can serve as a light guide panel (hereinafter "LGP") for distributing backlight emitted from a light source such as, for example, a LED. In embodiments that use substructure 20 as a LGP, the shape of substructure 20 can be designed to minimize the impact of backlighting performance. For example, substructure 20 can occupy an outer periphery of keycap 14, thereby leaving an interior portion of keycap largely unobfuscated. The use of a LGP as part of substructure 20 is discussed in more detail below.

The combination of keycap 14 and substructure 20 (and potentially other components such as switch 40, electronics (not shown), and flex circuitry (not shown)) is sometimes referred to herein as a keycap assembly. In some embodiments, depending on the stiffness of keycap 14, a relatively strong substructure is needed to provide the rigidity needed for property operation of key mechanism 12. For example, if keycap 14 is constructed from a plastic, substructure 20 may be constructed from metal. In other embodiments, keycap 14 can be constructed from a relatively stiff material such as glass and substructure can be constructed from a plastic or metal material. In yet another embodiment, keycap 14 and substructure 20 can be an integrally formed keycap assembly. For example, keycap 14 and substructure 20 can be formed from a single plastic mold or a single piece of machined glass.

Switch 40 can be any suitable mechanical switch such as a dome switch. A metal dome switch or an elastomeric dome switch may be used, for example. As will be explained more detail in connection with FIG. 4, switch 40 can bias the keycap assembly to be in its natural, non-depressed position. In other words, when key mechanism is not undergoing a keystroke event, switch 40 can bias the keycap assembly to be in its non-depressed position. When key mechanism 12 is subjected to a keystroke event, switch 40 can buckle under the force applied to keycap 14, thereby enabling the keycap assembly to be in its depressed position. When the keycap assembly is in its depressed position, the keystroke can be registered by circuitry associated with switch 40 or by other circuitry contained within key mechanism (e.g., a parallel plate sensor membrane).

Butterfly hinge 50 functions as the movable hinge that enables the keycap assembly to move relative to support structure 70. Butterfly hinge 50 can include wings 51 and 52, which are separate components coupled together by coupling mechanisms 60. Wing 51 includes keycap assembly pins 54 and pivot pins 55, and wing 52 includes keycap assembly pins 57 and pivot pins 56. Wings 51 and 52 may each include a cutout such that when wings 51 and 52 are coupled together, cavity 53 exists. Cavity 53 can have any suitable shape such as, for example, a square, a rectangle, circle, or ellipse.

Keycap assembly pins 54 and 57 are coupled to pin retaining mechanisms 22a, 22b of substructure 20. Pivot pins 55 and 56 are coupled to pivot pin retaining members 75 and 76, respectively, of support structure 70. The manner in which pins are coupled to substructure 20 and support structure 70 vary depending on specific embodiments, discussed below.

Coupling mechanisms 60, though coupling wings 51 and 52 together, may enable wings 51 and 52 to move independent of each other. Thus, if one wing were locked in a position, the other wing would be free to move, and vice versa. However, as will be explained in FIGS. 4-5, wings 51 and 52 are both secured to support structure 70 and are operative to move (or flap) in concert with each other, with coupling mechanism 60 changing between substantially flat-shaped and v-shaped positions. Many different embodiments of coupling mechanisms 60 can be used with butterfly hinge 50. These embodiments are discussed in more detail in connection with the description below accompanying FIGS. 4-5. In other embodiments, coupling hinges 60 can be omitted from butterfly hinge 50.

Support structure 70 can be constructed from any suitable material or combination of different materials. The specific construction and materials used depends on particular key mechanism embodiment being employed, and thus these notable features are discussed in more detail below. One notable feature of structure 70 shown in FIG. 3 is cutouts 77. Cutouts 77 are positioned in predetermined positions on structure 70 so that pin retaining mechanism 22 of substructure 20 can fit into a respective cutout when the key mechanism is in its depressed position. This nestling of components within each other during a keystroke helps key mechanism 12 maintain its relatively thin z-height.

Figure 4A:
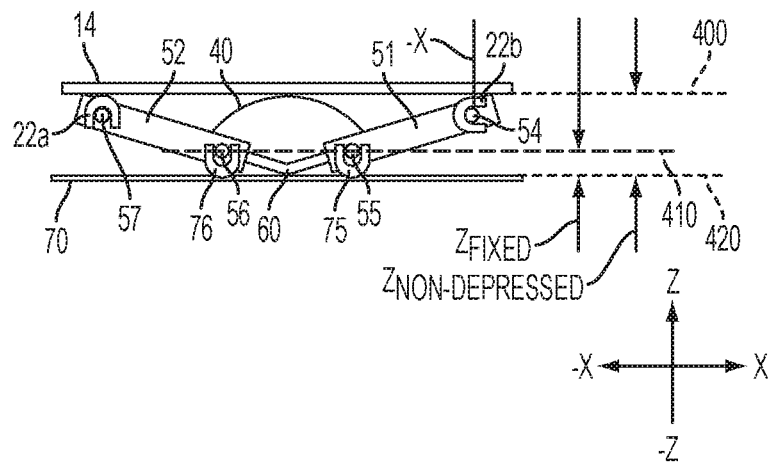
FIGS. 4A-4B show respective illustrative partial cross-sectional views of a key mechanism in a non-depressed position and depressed position in accordance with an embodiment.
Figure 4B:
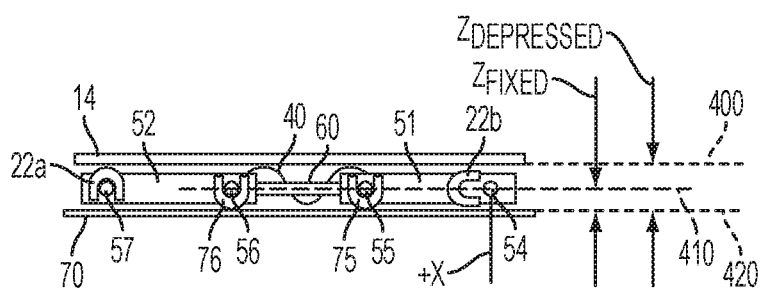
Figure 5A:
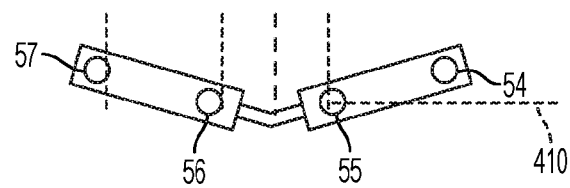
FIGS. 5A-5C show illustrative views of butterfly hinge in accordance with an embodiment.
Figure 5B:
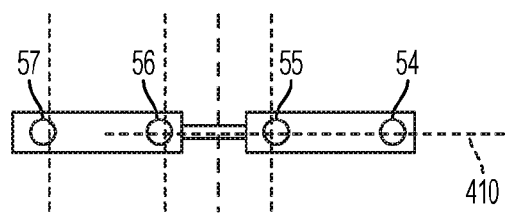
Figure 5C:
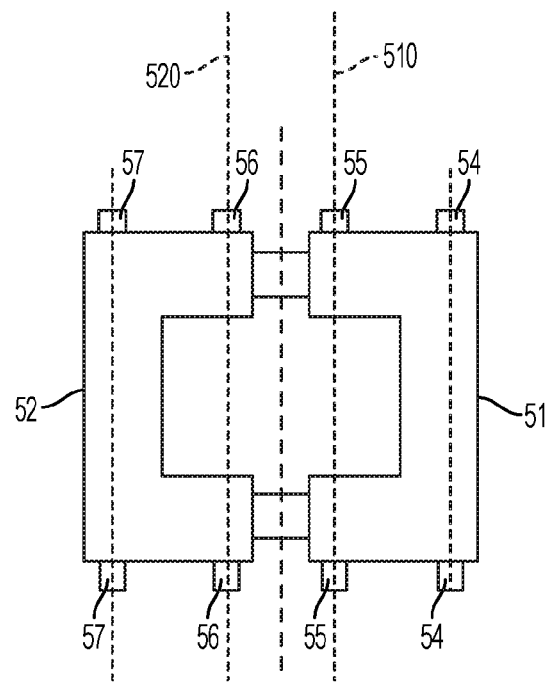

Referring now to FIGS. 4A-4B, illustrative partial cross-sectional views of key mechanism 12 are shown in a non-depressed position (FIG. 4A) and depressed position (FIG. 4B). Both figures show keycap 14, pin retaining mechanism 22a, 22b of substructure 20, wing 51 with pivot pin 55 and keycap assembly pin 54, wing 52 with pivot pin 56 and keycap assembly pin 57, coupling member 60, switch 40, support structure 70, and pivot pin retaining members 75 and 76. Other components of key mechanism 12 have been omitted to provide less cluttered figures and to promote ease of discussion.

FIGS. 4A-4B also show keycap plane 400, pivot pin plane 410, and structure plane 420. Regardless of whether key mechanism 12 is in its depressed or non-depressed state, the position of pivot pin plane 410 and structure plane 420 remain fixed, as indicated by the set of double arrows demarcating the z-height (shown as Zfixed) between the two planes in both figures. The z-height between keycap plane 400 and the structure plane 420, however, changes depending on the position of key mechansim 12. In the depressed position, the z-height is Zdepressed, as shown, and in the non-depressed position, the z-height is Znon-depressed.

Pivot pin retaining members 75 and 76 are operative to securely hold pivot pins 55 and 56 in place, while enabling pivot pins 55 and 56 to rotate within pivot pin retaining members 75 and 76. Keycap assembly pin 57 is coupled to pin retaining mechanism 22a, which can secure keycap assembly pin 57 to substructure 20 (not shown) in a manner similar to how pivot pin retaining members 75 and 76 secure their pins. Thus, pin retaining mechanism 22a may rotate when keycap 14 is undergoing a keystroke. Keycap assembly pin 54 can be coupled to pin retaining mechanism 22b, which is operative to enable keycap assembly pin 54 to slide horizontally within the pin retaining mechanism as key mechanism 12 travels up and down. Thus, the pin retaining system uses three sets of pin retaining mechanisms (one set for each pair of pins 57, 56, and 55) for securing rotating pins 57, 56, and 55 in place with minimal horizontal movement, and a fourth set (for pins 54) for securing sliding pins 54 in place with a fixed amount of horizontal movement. Additional aspects and features on the retaining mechanisms are discussed in more detail below for various different embodiments.

Referring collectively now to FIGS. 4A-4B and FIGS. 5A-5C, wings 51 and wings 52 pivot about their own respective pivot axes. Wing 51 pivots about axis 510, which runs co-axially with the center axis of pivot pins 55, and wing 52 pivots about axis 520, which runs co-axially with the center axis of pivot pins 56. Since pivot pins 55 and 56 are secured in position with respect to structure 70 (as shown by fixed z-height Zfixed), it is the outer portions of wings 51 and 52 (particularly at keycap assembly pins 54 and 57) that move relative to pivot pins 55 and 56.

In the non-depressed position, switch 40 is in its natural unbuckled position. In this position, switch 40 biases keycap 14 upwards when key mechanism 12 is not being subjected to a keystroke event. With the upward bias of switch 40, it pushes keycap 14 up, resulting in having pin retaining mechanism 22a, 22b pull keycap assembly pins 54, 57 of wings 51, 52 up. Since, pivot pins 55 and 56 are secured in place, wings 51 and 52 pivot about their own respective pivot axes 510 and 520, and keycap assembly pin 57 remains fixed in position, keycap assembly pin 54 slides horizontally to the left (shown here as the −X direction) within pin retaining mechanism 22b. As shown, in the non-depressed position, wings 51 and 52 resemble a v-shaped hinge, with its outer portions (e.g., pin regions 57 and 54) raised relative to pin plane 410.

In the depressed position, switch 40 is buckled, and keycap 14 has moved down vertically, thereby pushing the outer portions of wings 51 and 52 down towards support structure 70. Pins 57, 56, and 55 are secured in place and rotate within their secured positions, whereas keycap assembly pin 54 slides horizontally within its retaining mechanism in the +X direction. As shown in FIGS. 4A-4B, the relative position of keycap assembly pin 54 moves to the +X direction when the key mechanism 12 is in the depressed position. Moreover, in the depressed position, wings 51 and 52 resemble a log shaped hinge, with all pins 54-57 in substantially the same plane.

Use of the butterfly hinge 50 in key mechanism 12 provides not only a low travel keystroke, but a stable key mechanism. The double wing design of butterfly hinge 50 distributes loading evenly with respect to the keycap assembly. The evenly distributed loading is accomplished by placing the load bearing keycap assembly pins 57 and 54 at the outer portions of wings 51 and 52, respectively. This stable loading is translated to keycap 14 because regardless of where a user presses down on keycap 14, the load will be distributed across the key, resulting in a tactically desirable and non-wavering keystroke.

Figure 6:
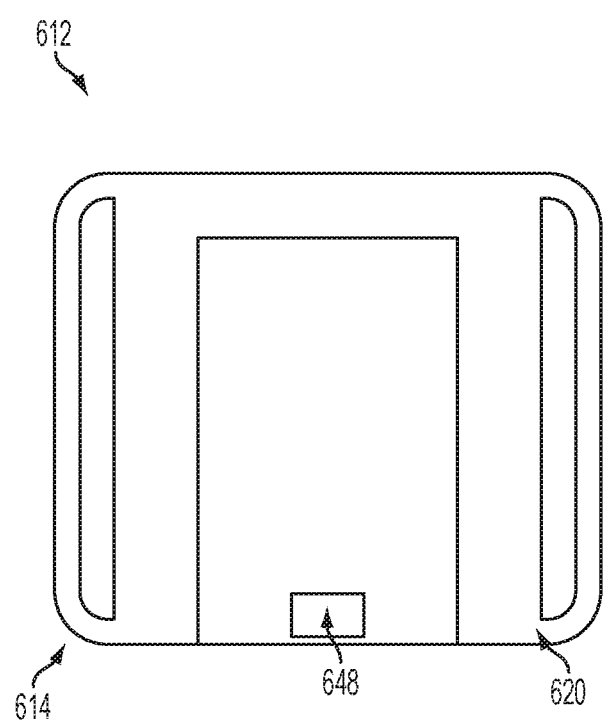
FIG. 6 shows illustrative top view of a key mechanism in accordance with an embodiment.

Referring now to FIGS. 6-16, a low travel key mechanism according to an embodiment is discussed. Features discussed above in connection with FIGS. 2-5 apply to similar features discussed in connection with FIGS. 6-16, however, notable features will be discussed in more detail. FIG. 6 shows an illustrative top view of key mechanism 612, showing keycap 614 and a few internal features shown by hidden lines. In particular, substructure 620 (with integrated light guide panel) and LED 648 are shown by hidden lines.

Figure 7:
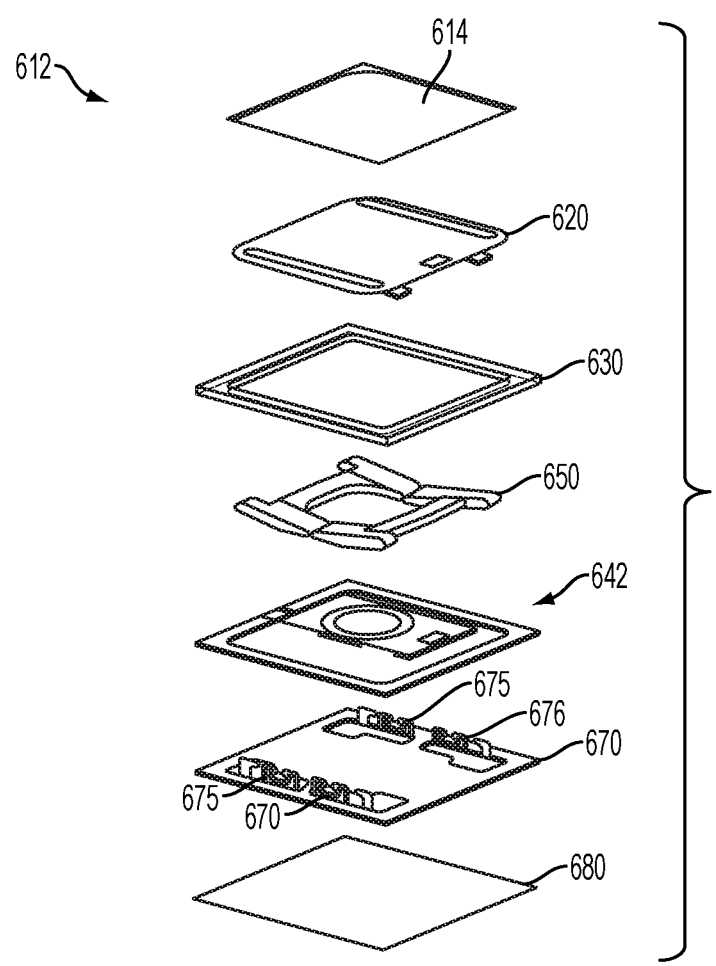
FIG. 7 shows an illustrative exploded view of the key mechanism of FIG. 6 in accordance with an embodiment.
Figure 8:
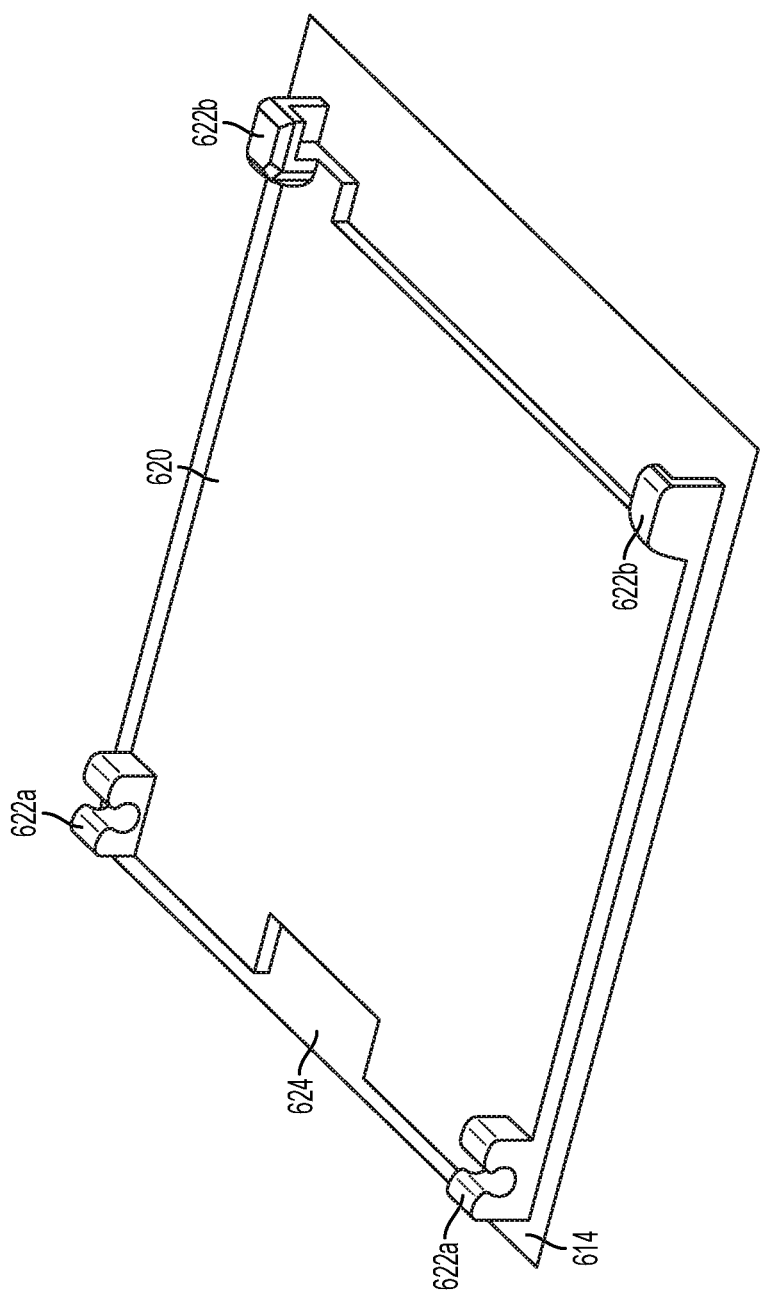
FIG. 8 shows an illustrative perspective view of a keycap assembly in accordance with an embodiment.

FIG. 7 shows an illustrative exploded view of key mechanism 612. As shown, key mechanism 612 can include keycap 614, substructure 620, web 630, electronic package 642, butterfly hinge 650, support structure 670, and cover plate 680. Cover plate 680 can be a printed circuit board or a heat spreader. FIG. 8 shows an illustrative perspective view of the bottom of keycap 614 and substructure 620, with substructure 620 secured to keycap 614. In this embodiment, substructure 620 doubles as a pin retaining structure and a LGP. The LGP aspect of substructure 620 is evident in that it occupies a majority of the surface area of keycap 614 and includes notch 624 for enabling a light source, such as LED 648, to fit adjacent to the LGP.

As shown, substructure 620 has pin retaining mechanisms 622a and 622b located near the corners of keycap 614. Pin retaining mechanisms 622a are operative to securely couple pins and allow the pins to rotate freely within. In particular, pin retaining mechanisms 622a can be c-clip retaining members. Pin retaining mechanisms 622b are operative to slidably couple pins therein. That is, the pins are retained within the mechanism, but are allowed to slide horizontally within the mechanism when the key mechanism is undergoing a keystroke event. Pin retaining mechanism 622b can have an extruded L-shape that extends a minimum distance sufficient to contain the sliding pin. Note that both pin retaining mechanisms 622b may face each other. It is understood that any suitable number of different configurations of pin retaining mechanisms 622b can be used to achieve the desired coupling effect.

Figure 9:
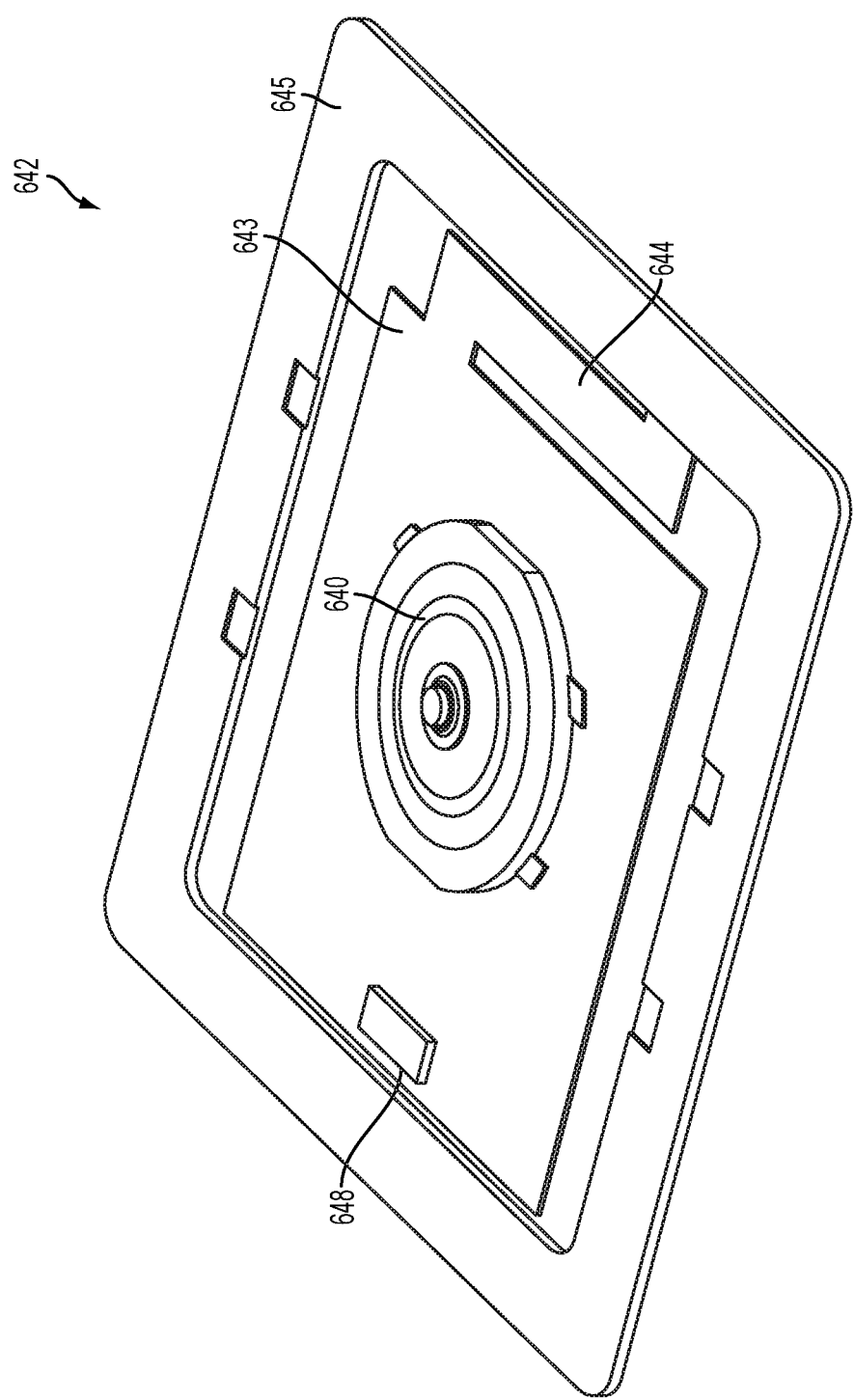
FIG. 9 shows an illustrative perspective view of an electronics package in accordance with an embodiment.
Figure 10:
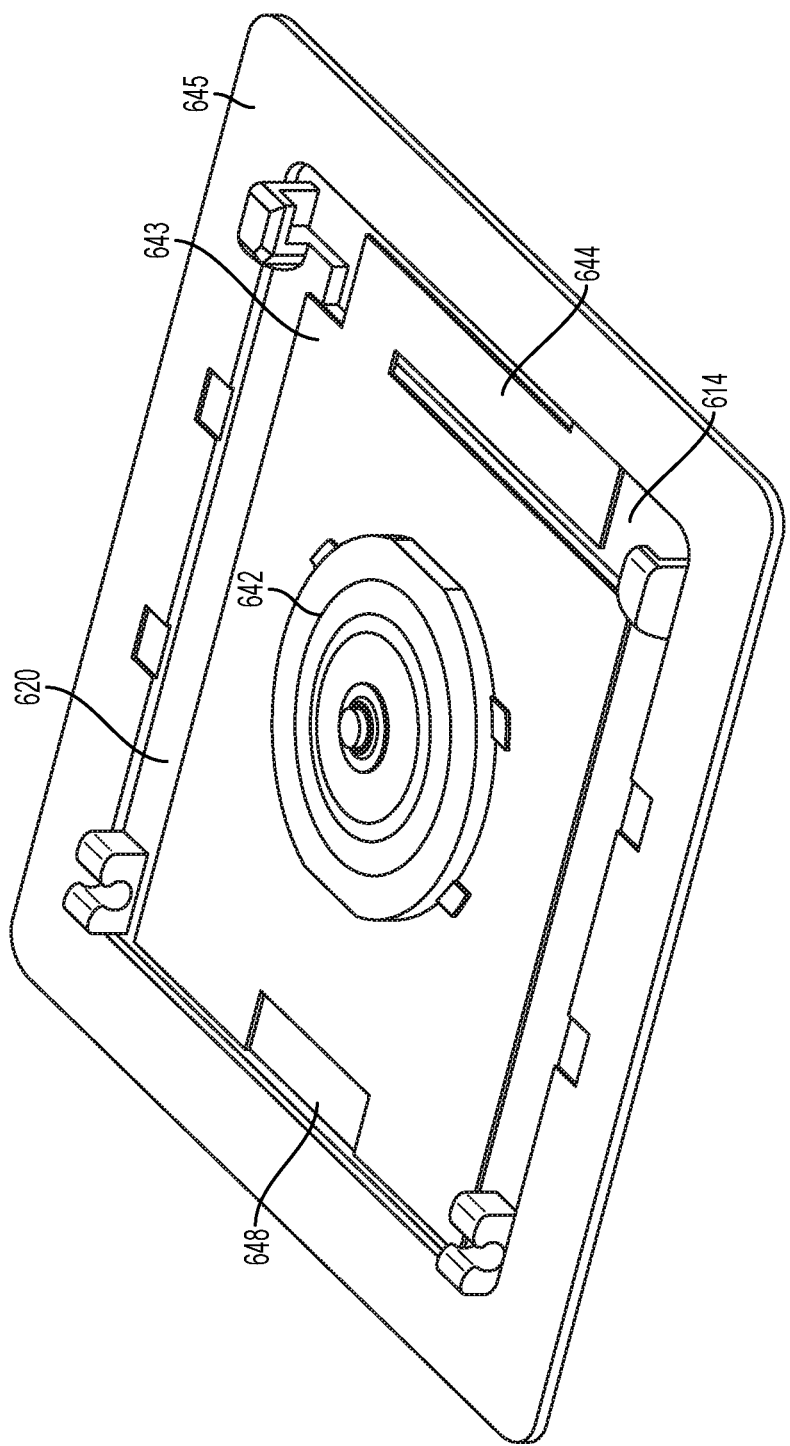
FIG. 10 shows an illustrative perspective view of keycap assembly and electronics package in accordance with an embodiment.

FIG. 9 shows an illustrative perspective bottom view of electronics package 642. Electronics package can include switch 640, which is mounted to flexible printed circuit board (PCB) 643, connector portion 644, support portion 645, and LED 648. In other embodiments, electronics package 642 can include a display such as OLED display. Referring to both FIGS. 9 and 10, electronics package 642 is mounted to substructure 620. In this arrangement, the base of switch 640 is pressed against substructure 620, and LED 648 fits within notch 624 (FIG. 8). Support portion 645 floats relative to PCB 643 via connector portion 644 and surrounds keycap 614 and substructure 620. Thus, when key mechanism 612 is assembled, the nipple side of switch 640 faces downward towards support structure 670 (not shown), and passes through cavity 653 of butterfly hinge 650 (shown in FIG. 11). In addition, when assembled, support portion 645 can align with web 630 (FIG. 7) and both web 630 and support portion 645 can be secured to support structure 670 (FIG. 7).

Figure 11:
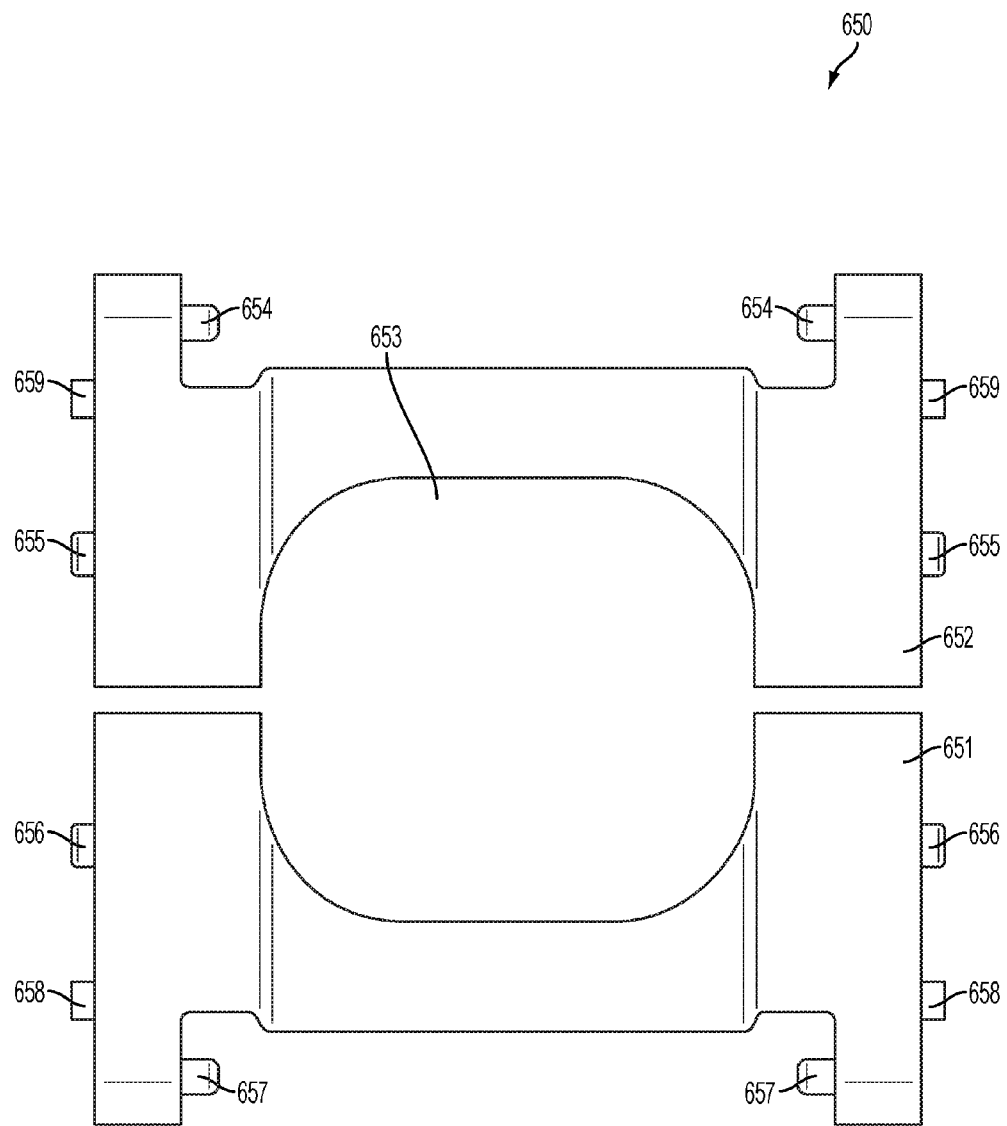
FIG. 11 shows an illustrative top view of a butterfly hinge in accordance with an embodiment.

FIG. 11 shows an illustrative top view of butterfly hinge 650. Butterfly hinge 650 includes wings 651 and 652. No coupling mechanisms are shown coupling wings 651 and 652 together in this detailed view. Wing 651 can include pivot pins 656, keycap assembly pins 657, and upstop members 658. Wing 652 can include pivot pins 655, keycap assembly pins 654, and upstop members 659. Both wings 651 and 652 are shaped so that cavity 653 exists when the wings are placed adjacent to one another. Pivot pins 655 and 656 and upstop members 658 and 659 extend away from the outside surface of butterfly hinge 650, whereas keycap assembly pins 654 and 657 extend within butterfly hinge 650. Pivot pins 655 and upstop members 659 may be coplanar with each other and extend about the same distance away from butterfly hinge 650. Similarly, pivot pins 656 and upstop members 658 may be coplanar with each other and extend about the same distance away from butterfly hinge 650.

Figure 12:
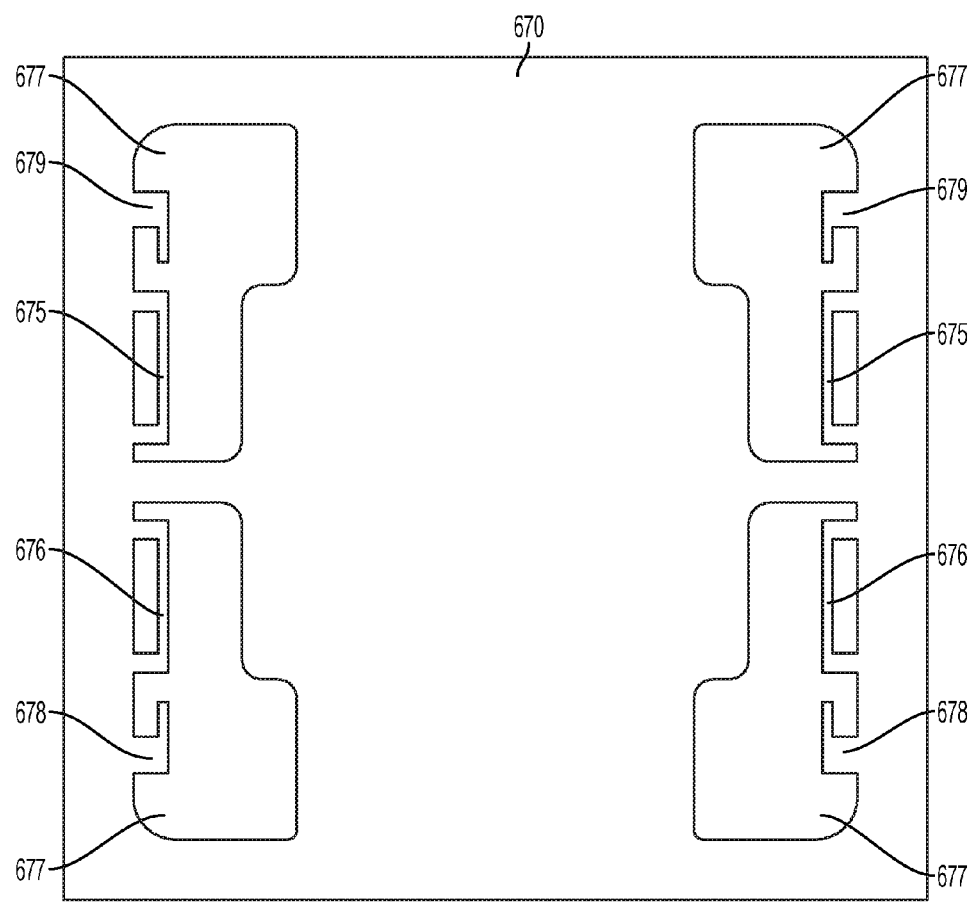
FIG. 12 shows an illustrative top view of a support structure in accordance with an embodiment.

FIG. 12 shows an illustrative top view of support structure 670. Support structure 670 has pivot pin retaining members 675 and 676, and upstops 678 and 679. Pivot pin retaining members 675 and 676 are operative to secure pivot pins 655 and 656, respectively, in place but enable the pins to rotate freely within. Pivot pin retaining members 675 and 676 may be c-clip types of retaining members. Upstops 678 and 679 may be hook shaped members operative to engage upstop members 658 and 659, respectively. Upstops 678 and 679 ensure that wings 651 and 652 do not travel up beyond a pre-determined vertical distance when key mechanism is in its natural, un-depressed position. Support structure 670 can also include cutouts 677.

Figure 13:
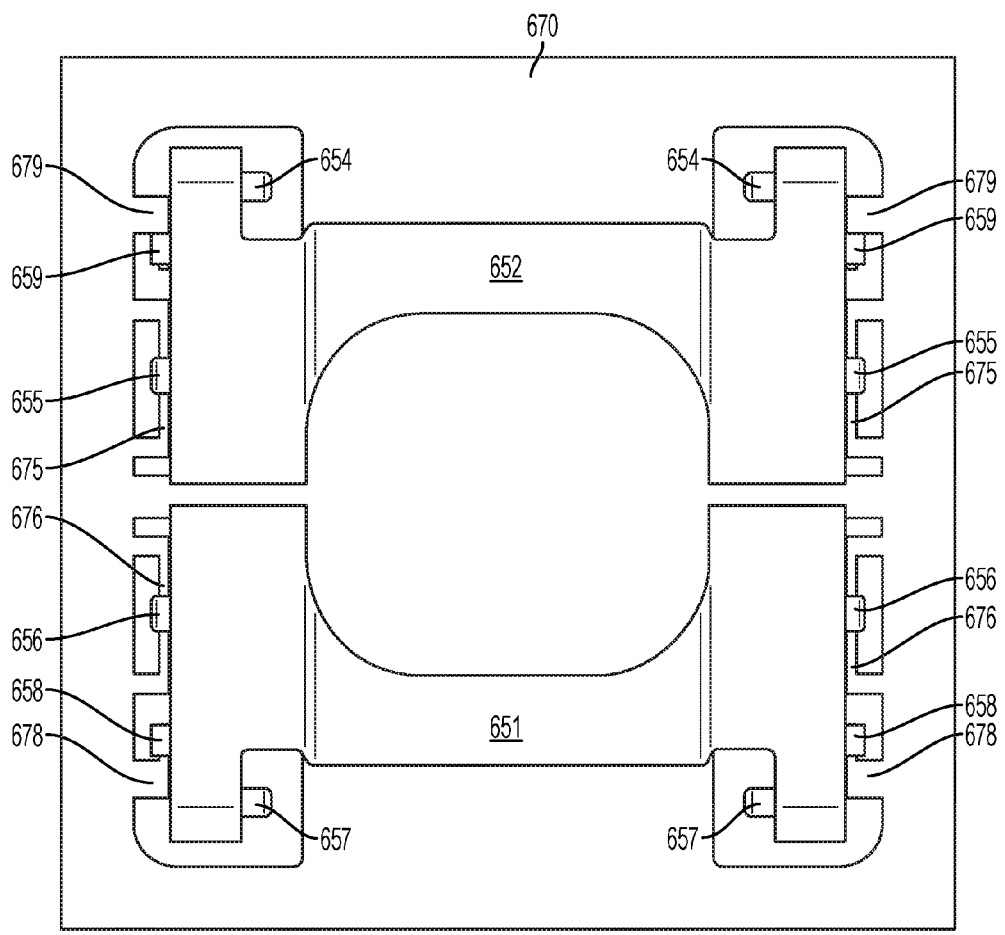
FIG. 13 shows an illustrative top view of a butterfly hinge coupled to support structure in accordance with an embodiment.
Figure 15:
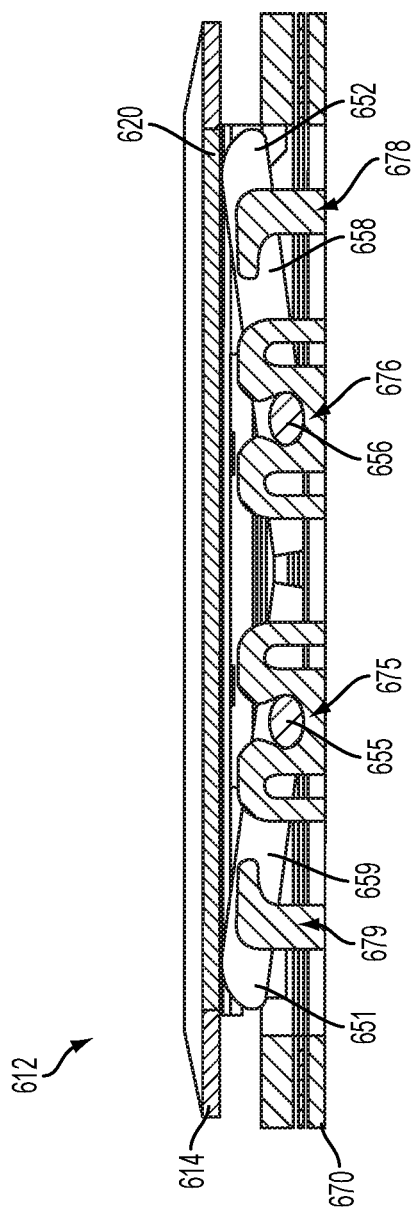
FIGS. 15-16 show illustrative cross-sectional views of a key mechanism in accordance with an embodiment.

FIG. 13 shows an illustrative top view of butterfly hinge 650 coupled to support structure 670. In this view, pivot pins 655 and 656 are secured to support structure 670 via pivot pin retaining members 675 and 676, respectively, and upstop members 658 and 659 are positioned under upstops 678 and 679, respectively. FIG. 13 also shows how end portions (centered around keycap assembly pins 654 and 657) are positioned over cutouts 677. FIG. 15 shows an illustrative cross-sectional view of key mechanism 612, showing the interaction of pivot pins 655 and 656 with pivot pin retaining members 675 and 676 and, upstop members 658 and 659 with upstops 678 and 679.

Figure 14A:
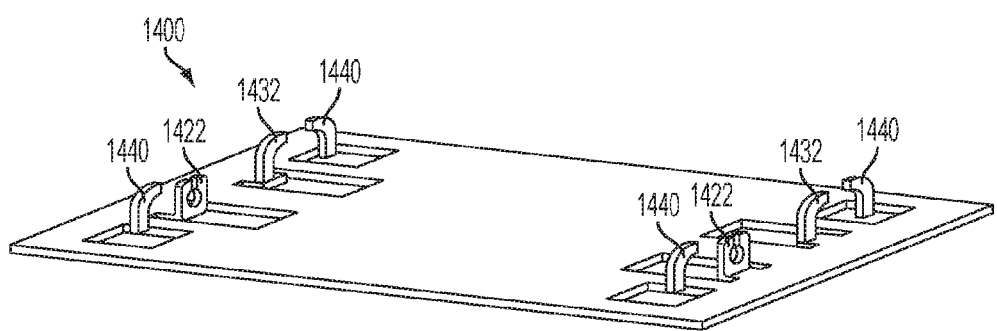
FIG. 14A shows an illustrative top view of an alternative support structure in accordance with an embodiment.
Figure 14B:
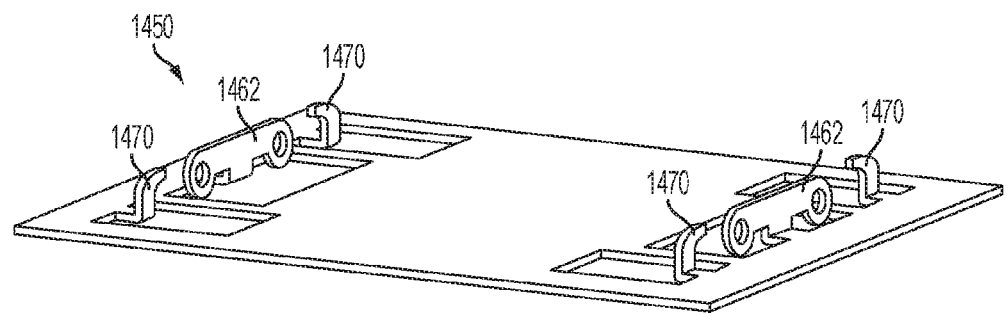
FIG. 14B shows an illustrative top view of a yet another alternative support structure in accordance with an embodiment.

FIGS. 14A-14B show perspective views of alternative support structures according to various embodiments. In particular, FIG. 14A shows a different retaining member configuration for securing butterfly hinge 650 to support structure 1400. Support structure 1400 includes c-clip retaining members 1422, and hook retaining members 1432 for retaining pins of a butterfly hinge (not shown). Structure 1400 also includes upstop members 1440.

FIG. 14B shows support structure 1450 that includes pivot pin retaining member 1462 and upstop members 1470. Pivot pin retaining member 1462 is a one piece construction including two circular eyes for holding pivot pins. Pivot pin retaining member 1462 can have a spring loaded bias to press against the butterfly hinge when its pivot pins are secured within the eyes.

Figure 16:
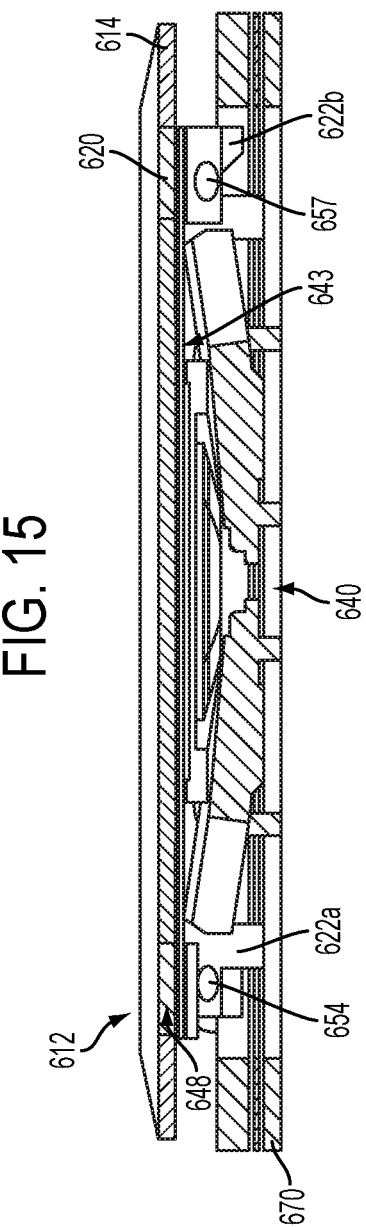

FIG. 16 shows another illustrative cross-sectional view of key mechanism 612 in a non-depressed position. This view shows switch 640 in a non-buckled position, wings 651 and 652 in a v-shaped arrangement, pin retaining mechanisms 622a, 622b, keycap assembly pins 657 and 654, and other components.

Figure 19:
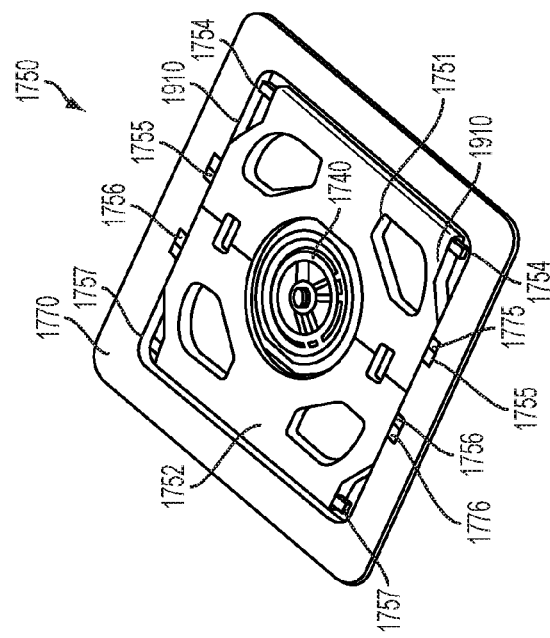
FIG. 19 shows an illustrative perspective view of a butterfly hinge and support structure in accordance with an embodiment.
Figure 17:
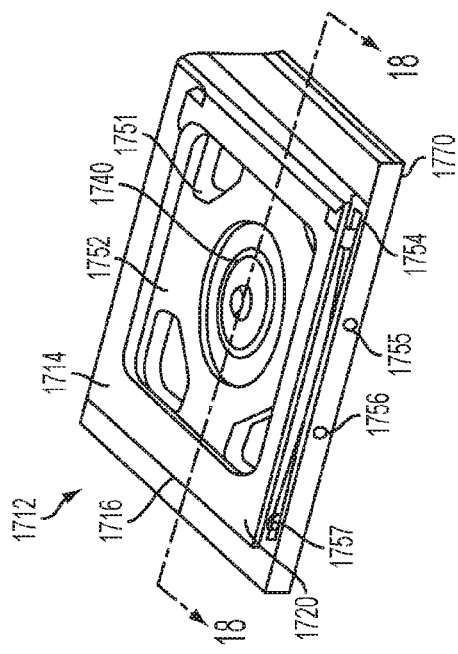
FIG. 17 shows an illustrative perspective view of another key mechanism in accordance with an embodiment.
Figure 18:
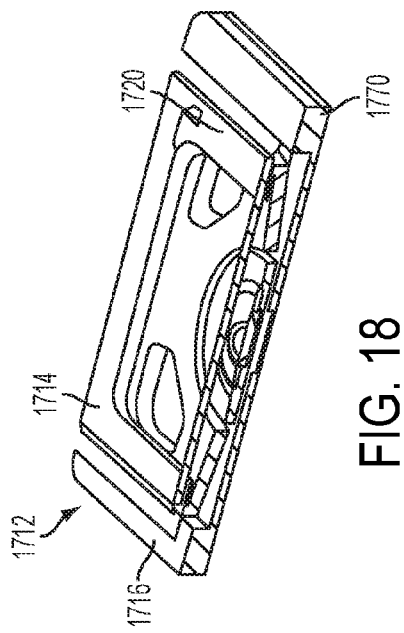
FIG. 18 shows an illustrative cross-sectional view of the key mechanism of FIG. 17 in accordance with an embodiment.

FIGS. 17-19 show various illustrative views of another key mechanism according to an embodiment. In particular, FIG. 17 shows an illustrative perspective view of key mechanism 1712 in a non-depressed position. FIG. 18 shows a cross-sectional view taken along line 18-18 in FIG. 17. And FIG. 19 shows an illustrative perspective view of key mechanism without a keycap assembly. Key mechanism 1712 exhibits many of the same attributes of the generic key mechanism of FIGS. 2-5, but includes more details regarding its hinge and support structure. As shown in FIG. 17, key mechanism 1712 can include keycap 1714, laminate layer 1716, substructure 1720, switch 1740, butterfly hinge 1750, and support structure 1770.

Butterfly hinge 1750 can include wings 1751 and 1752. Wing 1751 can include pivot pins 1755 and keycap assembly pins 1754. Wing 1752 can include pivot pins 1756 and keycap assembly pins 1757. Keycap assembly pins 1754 and 1757 are coupled to substructure 1720, and pivot pins 1755 and 1756 are coupled to support structure 1770. Pivot pins 1755 and 1756 are secured within slots 1775 and 1776 of support structure 1770. Slots 1775 and 1776 may be cavities in the structure 1770 that are covered by laminate material 1716. In some embodiments, laminate material 1716 can be the same as a web (such as web 30). In effect, laminate material 1716 locks pivot pins 1755 and 1756 in place within support structure 1770. In this embodiment, pivot pins 1755, 1756 and keycap assembly pins 1754, 1757 all extend away from butterfly hinge 1750.

Switch 1740 can fit in a cavity existing between wings 1751 and 1752, as shown. In this particular embodiment, the base of switch 1740 can reside on support structure 1770, as opposed to being fixed to substructure 1720. When key mechanism 1712 is in its non-depressed position, switch 1740 is in its unbuckled state and props or biases the keycap assembly up. When key mechanism 1712 is in its depressed position, switch 1740 will be buckled and wings 1751 and 1752 will be pressed down in a log shaped position, with all pins 1754, 1755, 1756, 1757 in substantially the same plane.

Each wing can include upstops 1910, which are operative to limit the up-travel of the wings when the key mechanism is in its undepressed position. Upstops 1910 may engage laminate layer 1716 in the undepressed position. Upstops 1910 may be shaped at an angle to enable flush interfacing with the laminate layer.

Figure 20:
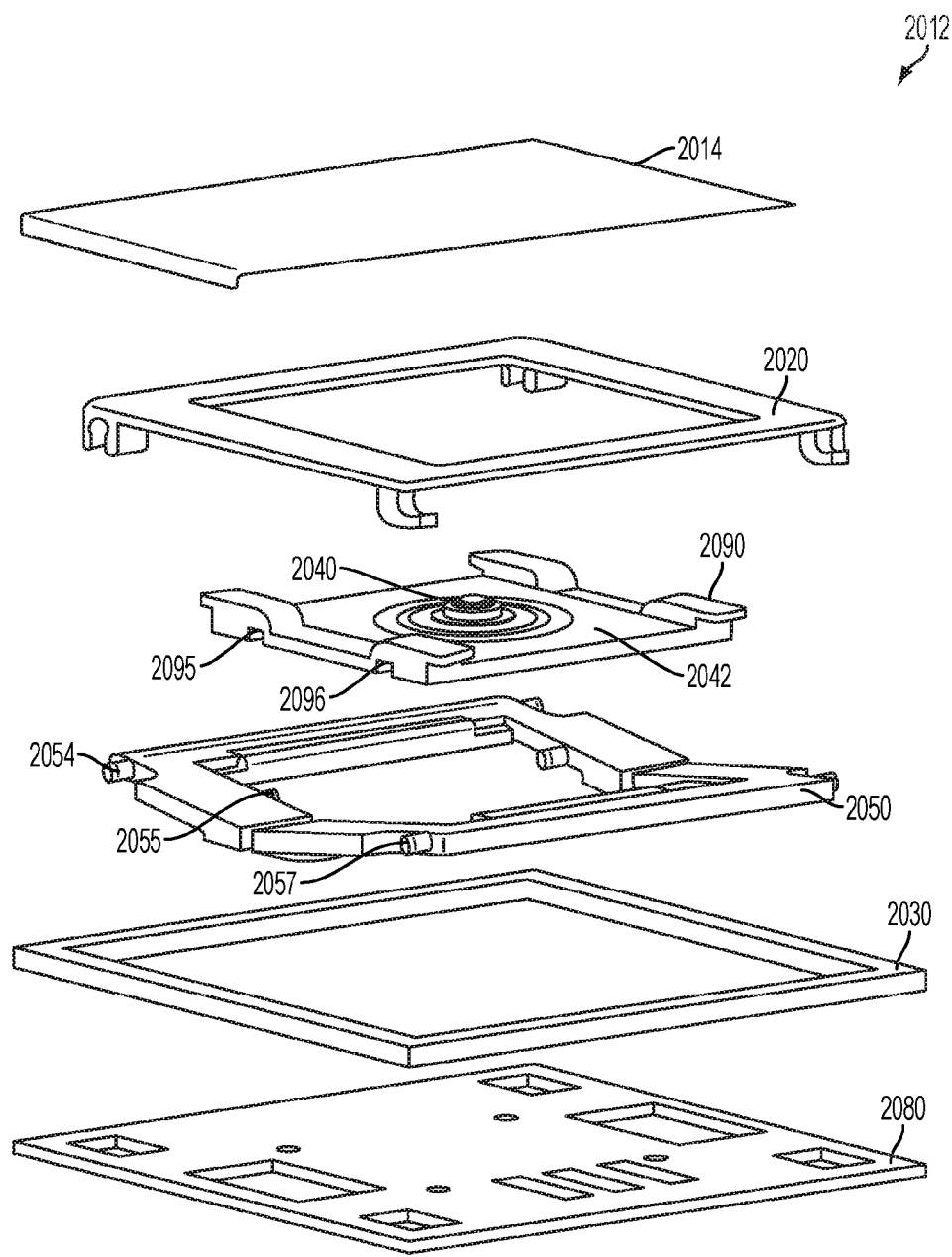
FIG. 20 shows an illustrative exploded view of a key mechanism in accordance with an embodiment.
Figure 23:
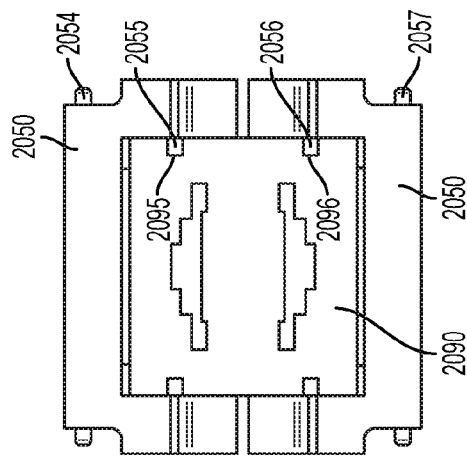
FIG. 23 shows an illustrative bottom view of a butterfly hinge coupled to a carrier structure in accordance with an embodiment.
Figure 22:
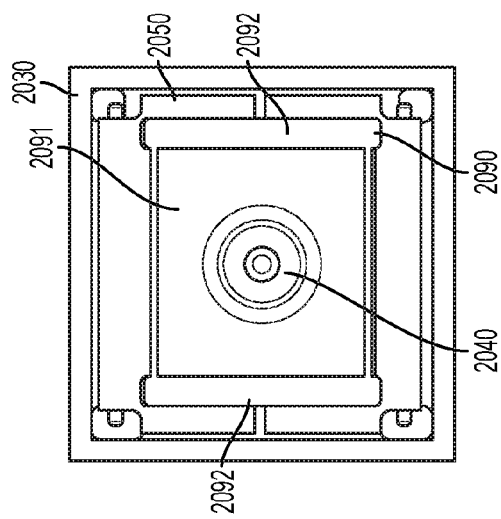
FIG. 22 shows an illustrative top view of a butterfly hinge coupled to a carrier structure in accordance with an embodiment.
Figure 21:
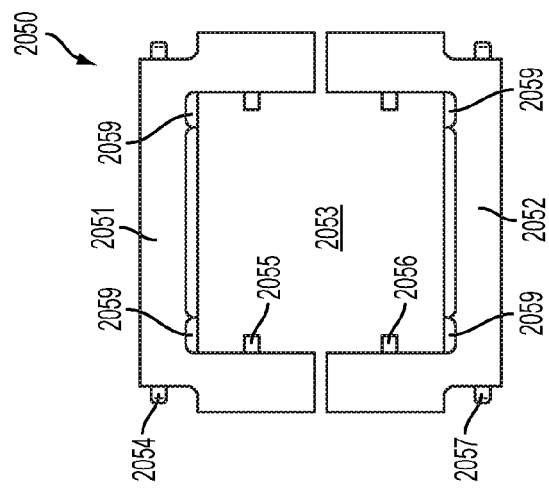
FIG. 21 shows an illustrative top view of a butterfly hinge in accordance with an embodiment.

FIGS. 20-28 show various illustrations of a key mechanism 2012 using a carrier plate according to an embodiment. References to key mechanism 2012 include all FIGS. 20-28, with occasional specific reference to individual figures. The carrier plate, as opposed to the structural support is responsible for securing the pivot pins of the butterfly hinge in place. In addition, the carrier plate can also support an electronic package. Referring now to FIG. 20, there is shown an exploded view of key mechanism 2012. Key mechanism 2012 can include keycap 2014, substructure 2020, carrier plate 2090, electronics package 2042, switch 2040, butterfly hinge 2050, web 2030, and circuit board 2080. Components discussed earlier in connection with FIGS. 2-5 may share characteristics with similar components of key mechanism 2012. For example, keycap 2014 and substructure 2020 and its interaction with keycap assembly pins of butterfly hinge 2050 is similar to how keycap 14 and substructure 20 interact with butterfly hinge 50.

Figure 28:
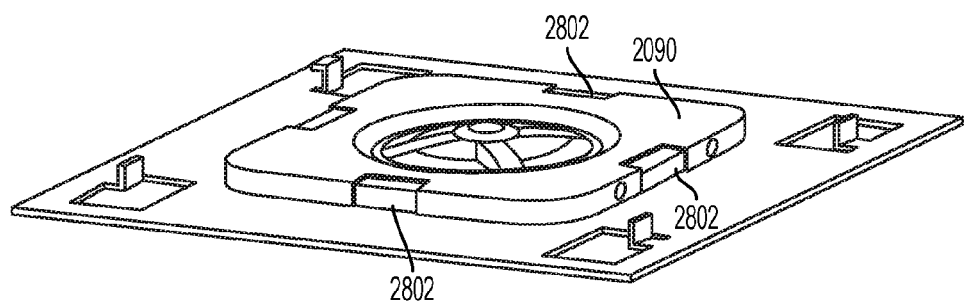
FIG. 28 shows an illustrative perspective view of carrier structure coupled to a support structure in accordance with an embodiment.

Carrier plate 2090 is constructed to fit within cavity 2053 (FIG. 21) of butterfly hinge 2050 and be secured to circuit board 2080. Carrier plate 2090 can be secured to circuit board 2080 in any number of suitable different ways. For example, it can be glued or welded to circuit board 2080. As another example, carrier plate 2090 can have several posts that extend from a bottom surface of the carrier plate and engage with corresponding cavities in circuit board 2080. As yet another example, carrier plate 2090 can be secured in place with two or more clips 2802, as shown in FIG. 28. When carrier plate 2090 is secured to circuit board 2080, it secures pivot pins 2056 and 2055 in place so that they are free to rotate in place within pivot pin retaining members 2095 and 2096. The pin arrangement of butterfly hinge 2050 is shown in more detail in FIG. 21, and the pivot pin retaining members of carrier plate 2090 is shown in more detail in FIGS. 22, 23, 24, and 25.

Butterfly hinge 2050 can include two wings 2051, 2052 connected together using a coupling mechanism (not shown). Any suitable coupling mechanism can be used. Various examples of such coupling mechanism are described in more detail below. Cavity 2053 can exist between the two wings 2051, 2052 when placed adjacent to each other.

Carrier plate 2090 can be constructed from any suitable material such as metal or plastic. The construction of carrier plate 2090 can include a flat plate 2091, which is flanked by two raised arm members 2092. Each raised arm member 2092 can include pivot pin retaining member 2095 and pivot pin retaining member 2096. In addition, each raised arm member 2092 can include two upstop protrusions 2099.

Upstop protrusions 2099 are operative to engage upstops 2059 of butterfly hinge 2050 when key mechanism 2012 is in its non-depressed position. Protrusions 2099 prevent wings 2051, 2052 of butterfly hinge 2050 from traveling beyond a fixed vertical up direction.

Flat plate 2091 can serve as a platform for electronics package 2042, which can include among other features, switch 2040, LED, light guide panel, display, and/or flex circuitry. This arrangement promotes easy connections between circuit board 2080 and electronics package 2042 because carrier plate 2090 is directly connected to circuit board 2080. This is in contrast to the flex printed circuit board embodiment associated with key mechanism 612 (described earlier). Moreover, as shown in this embodiment, switch 2040 is mounted such that its dome is facing substructure 2020 and keycap 2014. Thus, when switch 2040 is in its unbuckled position, it is operative to bias keycap 2014 and substructure 2020 upwards.

Figure 26:
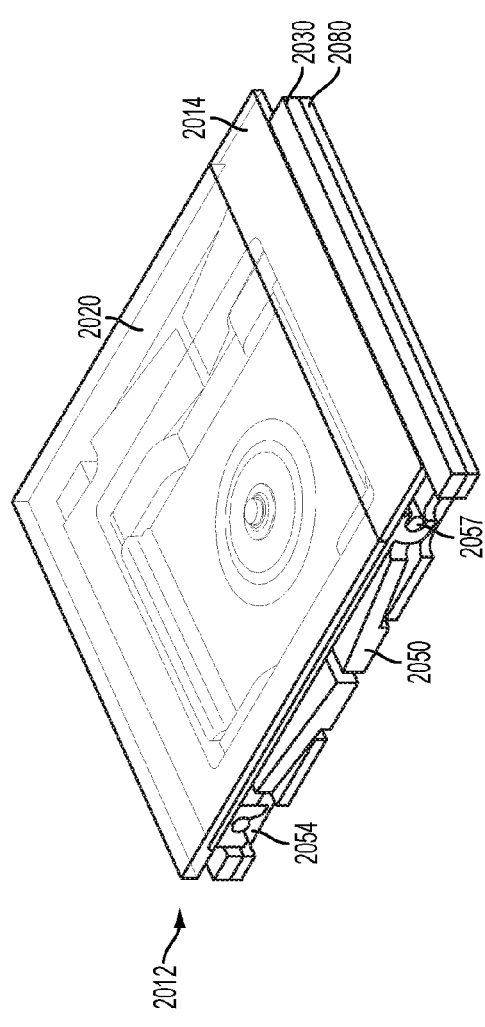
FIG. 26 shows an illustrative perspective view of a key mechanism in accordance with an embodiment.
Figure 27:
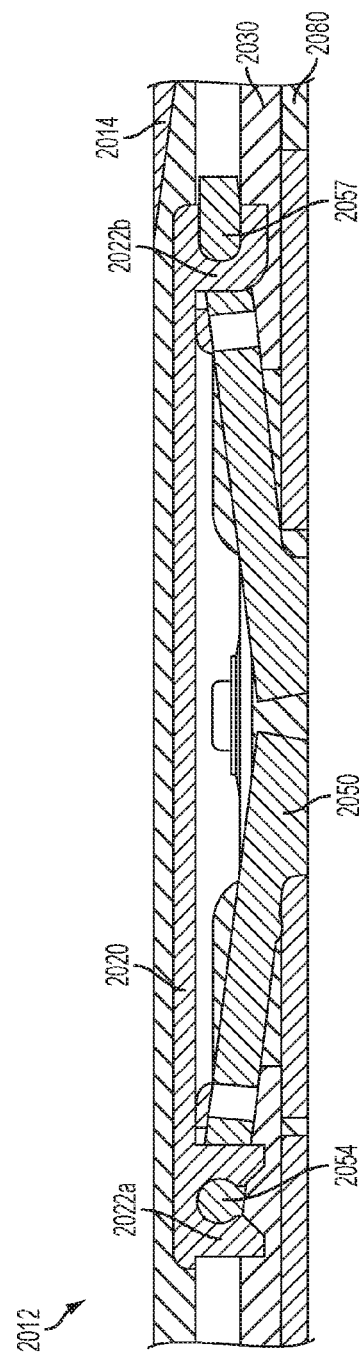
FIG. 27 shows an illustrative cross-sectional view of key mechanism in accordance to an embodiment.

Referring now to FIGS. 26 and 27, there are shown pin retaining mechanisms 2022a, 2022b of substructure 2020 interfacing with keycap assembly pins 2054 and 2057. In particular, FIG. 27 shows the different pin retaining mechanisms, pin retaining mechanism 2022a for securing keycap assembly pin 2054 in place so that it rotates in place, and pin retaining mechanism 2022b for enabling keycap assembly pin 2057 to slide horizontally when key mechanism 2012 is being depressed.

FIGS. 29-33 show several different butterfly hinge embodiments that can be used in conjunction with a key mechanism. Each of the embodiments discussed in connection with FIGS. 29-33 include two wings that are coupled together with a coupling mechanism. The nature of the coupling mechanism varies and can include two general types: living hinge and gear hinge. A living hinge coupling mechanism can be a flexible material or combination of materials that physically attaches the two wings together. A gear hinge is a coupling mechanism built into the wings themselves that allows for a gear-like interaction between the wings.

Figure 29B:
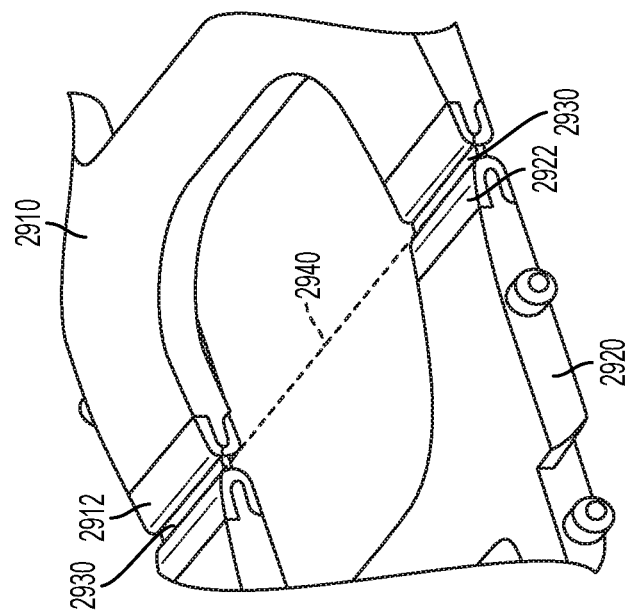
FIGS. 29A-29B show illustrative views of a butterfly hinge in accordance with an embodiment.
Figure 29A:
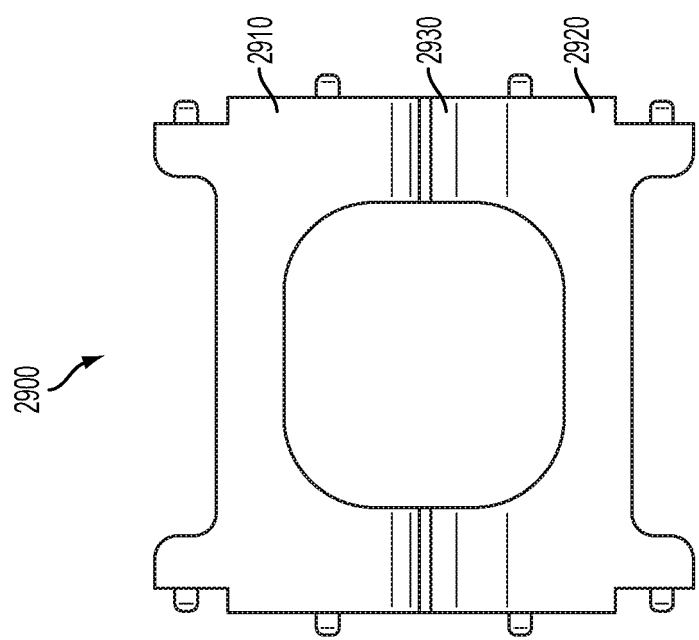

FIGS. 29A-29B show illustrative top and partial perspective views of butterfly hinge 2900 in accordance with an embodiment. Hinge 2900 includes wings 2910 and 2920 coupled together with living hinge 2930. Wings 2910 and 2920 can include pins as shown and can be made, for example, from a glass-filled plastic. Living hinge 2930 can be made from a plastic material that is softer than the material used to make the wings. Wings 2910 and 2920 also include self-locking structures 2912 and 2922.

Butterfly hinge 2900 can be manufactured using a double-shot process, wherein the first shot creates wings 2910 and 2920, and the second shot forms living hinge 2930. When the second shot is applied, it self-locks itself to self-locking structures 2912 and 2922 to couple wings 2910 and 2920 together. Note that the thickness of living hinge 2930 is substantially thinner at center axis 2940 of butterfly hinge 2900 than at other portions of living hinge 2930. The thinner section at the junction between wings 2910 and 2920 can promote ease of flexing between wings 2910 and 2920.

Figure 30B:
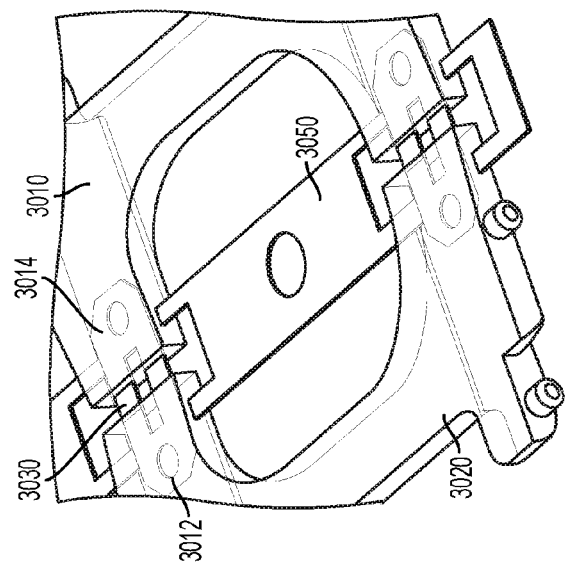
FIGS. 30A-30C show illustrative views of a butterfly hinge in accordance with an embodiment.
Figure 30C:
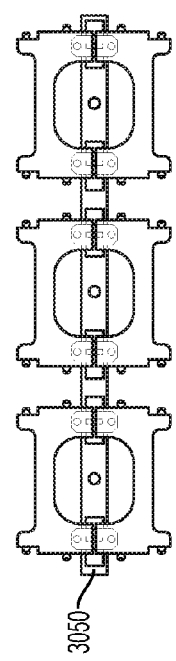
Figure 30A:
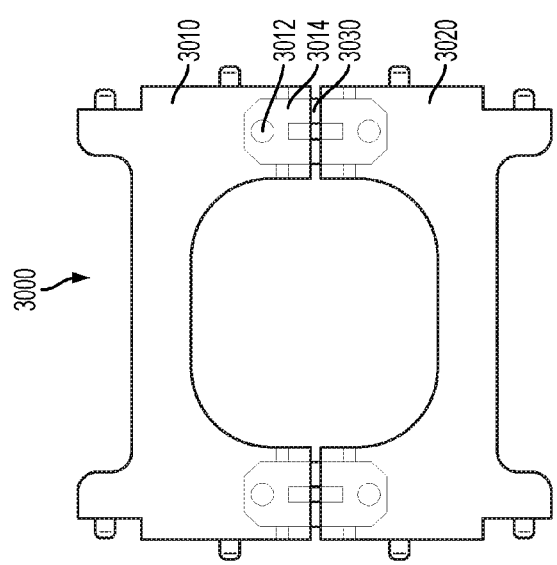

FIGS. 30A-30B show illustrative top and perspective views of butterfly hinge 3000 in accordance with an embodiment. Butterfly hinge 3000 can be manufactured by insert molding wings 3010 and 3020 around living hinge 3030. Molded wings 3010 and 3020 can include the pins, as shown. Living hinges 3030 can be part of a metal strip 3050 containing several living hinges 3030 (as shown in FIG. 30C). Including several living hinges 3030 on a single strip can increase manufacturing throughput of butterfly hinge 3000. After wings 3010 and 3020 are molded on to strip 3050, the strip can be cut away to yield an individual butterfly hinge 3000 that is suitable for use in a key mechanism. Wings 3010 and 3020 can be constructed, for example, with a plastic such as a glass filled plastic.

Living hinge 3030 can be a relatively thin piece of metal (e.g., steel) that is operative to bend to enable wings 3010 and 3020 to move when used in a key mechanism. Living hinge 3030 can include retention features 3012 and 3014 to promote adhesion to the wings when the wings are molded thereto. When wings 3010 and 3020 are molded onto strip 3050, shutoffs can be used to prevent wings from completely covering living hinge 3030, thereby leaving a portion of living hinge 3030 exposed.

Figure 31B:
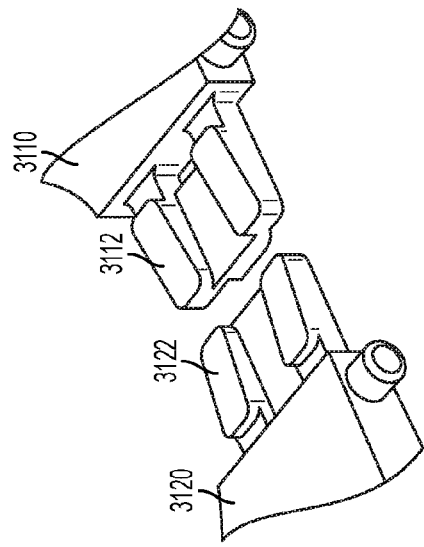
FIGS. 31A-31C show illustrative views of a butterfly hinge in accordance with an embodiment.
Figure 31C:
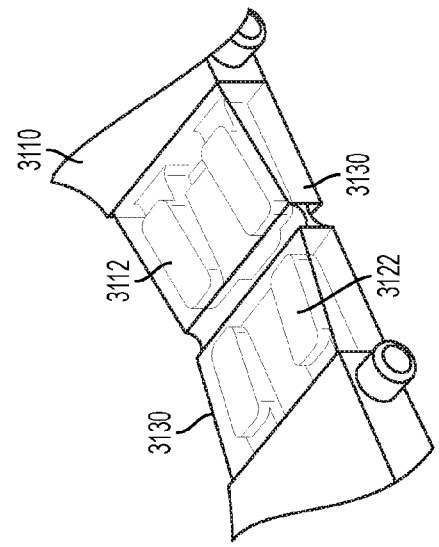
Figure 31A:
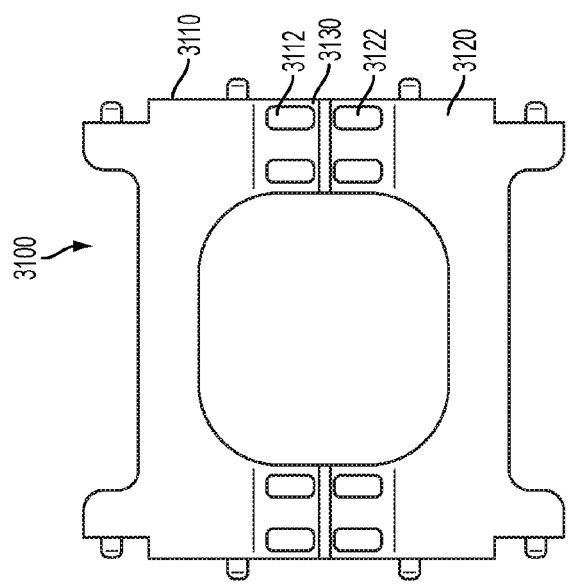

FIGS. 31A-31C show various views of butterfly hinge 3100 in accordance with an embodiment. Butterfly hinge 3100 can be constructed by coupling metal wings 3110 and 3120 together with an injection molded living hinge 3130. Wings 3110 and 3120 can be constructed from a die cast or forged metal. In one embodiment, wings can be formed from a zinc die cast. In this embodiment, the pins are also formed in the die cast or forged metal. Wings 3110 and 3120 can be constructed to have retention features 3112 and 3122 to assist living hinge 3130 retention. Living hinge 3130 can be any suitable compliant material capable of bending. For example, living hinge 3130 can be constructed from a plastic or rubber material.

FIGS. 32A-32C show illustrative views of butterfly hinge 3200 in accordance with an embodiment. Butterfly hinge 3200 can be constructed from two metal cores 3201 and 3202 (shown by hidden lines) that are overmolded with a molding material. The molding material fully encapsulates metal cores 3201 and 3202 to form wings 3210 and 3220, which each include pins formed by the overmold, and living hinge 3230. Cores 3201 and 3202 can be separate metal components with retention features 3205 incorporated therein. Retention features 3205 can enable the injected molded material to self-lock itself to cores 3201 and 3202.

Living hinge 3230 can be formed from the overmold that couples cores 3201 and 3202 together. It can be sized to be relatively narrow at the junction between wings 3210 and 3220 to promote ease of movement. Hinge 3200 can be constructed in batch fashion in that strip 3250 can contain several cores. The cores can be overmolded and then die cut to yield each butterfly hinge 3200.

In another embodiment (not shown), a butterfly hinge can be constructed from two metal cores, having forged or die cast pins, that are at least partially overmolded with a molding material, but in a way so that the pins are left exposed. This way, the metal pins are exposed and formed from metal, as opposed to an injection molded plastic. A living hinge is formed from the injection molded plastic coupling the two cores together.

Figure 33A:
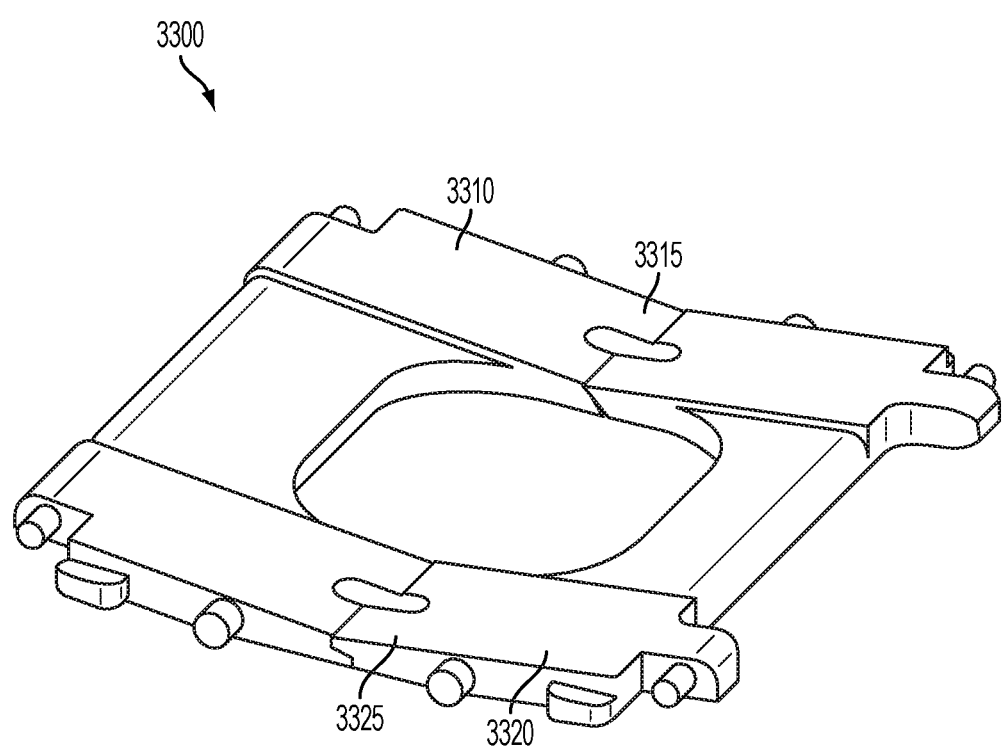
FIGS. 33A-33B show illustrative views of a butterfly hinge in accordance with an embodiment.
Figure 33B:
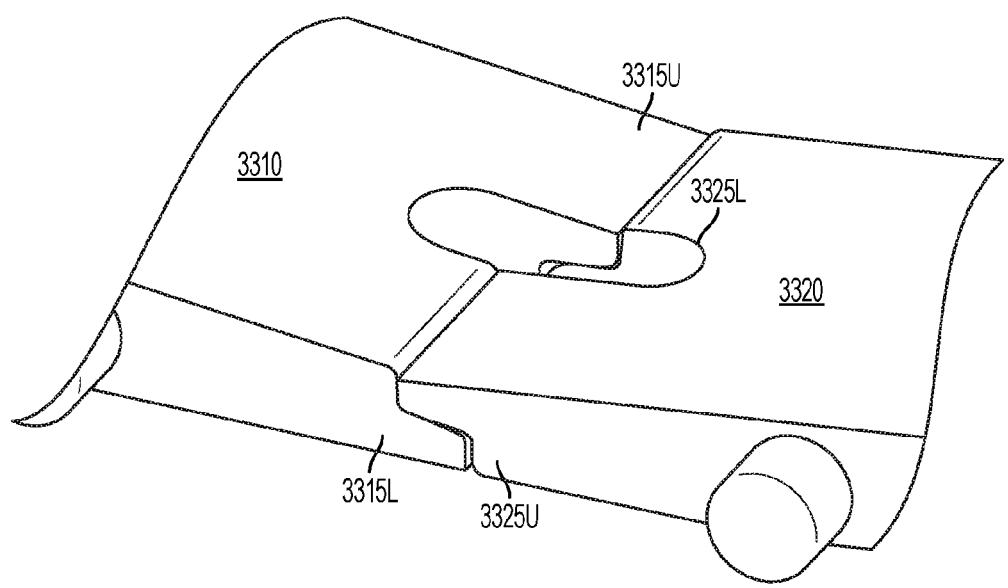

FIGS. 33A-33B show illustrative views of butterfly hinge 3300 in accordance with an embodiment. Hinge 3300 includes wings 3310 and 3320 that each include pins and upstops, as shown. Wing 3310 has gear members 3315 and wing 3320 has gear members 3325. Gear members 3315, 3325 interface with each other to form a gear hinge.

Referring to FIG. 33B, a close up of the gear hinge is shown. In particular the teeth of the gear members are shown. Wing 3310 has upper tooth 3315U and lower tooth 3315L, and wing 3320 has lower tooth 3325L and upper tooth 3325U. Upper tooth 3315U interfaces with lower tooth 3325L and upper tooth 3325U interfaces with lower tooth 3315L. This upper/lower tooth configuration can promote coupling of wings 3310 and 3320 when used in a key mechanism.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A key mechanism, comprising:
   a keycap;
   a substrate; and
   a butterfly hinge movably coupling the keycap to the substrate, the butterfly hinge comprising:
      a first wing;
      a second wing; and
      a living hinge flexibly coupling the first wing to the second wing; wherein
   the first wing comprises a first arm extending towards the second wing;
   the second wing comprises a second arm extending towards the first wing; and
   the living hinge joins an end of the first arm to an end of the second arm.

2. The key mechanism of claim 1,
   the first arm and the second arm each comprise retention features; and
   the living hinge conforms to the retention features to retain the living hinge to the first arm and the second arm.

3. The key mechanism of claim 2, wherein:
   the first wing and the second wing comprise a first polymer; and
   the living hinge comprises a second polymer that is more flexible than the first polymer.

4. The key mechanism of claim 3, wherein the second polymer is an elastomer.

5. The key mechanism of claim 3, wherein the retention features comprise protrusions.

6. The key mechanism of claim 1, wherein:
   the living hinge is a first living hinge;
   the key mechanism further comprises a second living hinge;
   the first wing comprises a third arm extending towards the second wing;
   the second wing comprises a fourth arm extending towards the first wing; and
   the second living hinge joins an end of the third arm to an end of the fourth arm.

7. A hinge mechanism for an input key, comprising:
   a first hinge member defining a first arm;
   a second hinge member defining a second arm and positioned opposite the first hinge member; and
   a flexible member at least partially encapsulated in the first arm and at least partially encapsulated in the second arm to couple the first arm to the second arm and to substantially synchronize the movement of the first and second hinges.

8. The hinge mechanism of claim 7, wherein:
   the hinge mechanism is incorporated in a keyboard mechanism comprising:
      a keyboard base;
      a keycap; and
      a dome switch coupled to the keyboard base below the keycap;
   the hinge mechanism is coupled to the keyboard base and the keycap and movably supports the keycap relative to the keyboard base; and
   the flexible member is formed from a metal.

9. The hinge mechanism of claim 8, wherein:
   the keyboard mechanism comprises a plate coupled to the keyboard base;
   the first and second hinges each comprise a pivot pin; and
   the respective pivot pins are captured between the keyboard base and respective portions of the plate.

10. The hinge mechanism of claim 7, wherein:
    the flexible member defines:
       a first retention feature; and
       a second retention feature;
    the first arm engages the first retention feature, thereby retaining the first arm to the flexible member; and
    the second arm engages the second retention feature, thereby retaining the second arm to the flexible member.

11. The hinge mechanism of claim 7, wherein:
    the first hinge member further comprises:
       a third arm; and
       a first cross-piece coupled to an end of the first arm and an end of the second arm; and
    the second hinge member further comprises:
       a fourth arm; and
       a second cross-piece coupled to an end of the second arm and an end of the fourth arm.

12. The hinge mechanism of claim 11, wherein:
    the first arm, the third arm, and the first cross-piece define a first U-shaped portion of a cavity between the first and the second hinge members; and
    the second arm, the fourth arm, and the second cross-piece define a second U-shaped portion of the cavity between the first and the second hinge members.

13. The hinge mechanism of claim 12, wherein:
    the hinge mechanism is incorporated in a keyboard comprising a dome switch; and
    the dome switch is positioned in the cavity between the first and the second hinge members.

14. A method of forming a hinge mechanism, comprising:
    forming a first wing comprising:
       a first cross-piece;
       a first arm extending from a first end of the first cross-piece; and
       a second arm extending from a second end of the first cross-piece;
    forming a second wing comprising:
       a second cross-piece;
       a third arm extending from a first end of the second cross-piece; and
       a fourth arm extending from a second end of the second cross-piece; and
    forming a living hinge coupling an end of the first arm to an end of the third arm.

15. The method of claim 14, wherein the operation of forming the living hinge comprises:
    positioning the first wing and the second wing in a mold; and
    injecting a flexible material into the mold and against the end of the first arm and the end of the third arm.

16. The method of claim 15, wherein:
- the end of the first arm and the end of the second arm each comprise a retention feature; and
- the operation of injecting the flexible material into the mold comprises at least partially encapsulating the retention features in the flexible material to lock the flexible material to the first arm and the second arm.

17. The method of claim 14, wherein:
- the living hinge is a first living hinge; and
- the method further comprises forming a second living hinge coupling an end of the second arm to an end of the fourth arm.

18. The method of claim 14, wherein the operations of forming the first wing and the second wing comprise injecting a polymer material into a mold.

19. The method of claim 18, wherein:
- the method further comprises placing a metal insert into the mold prior to injecting the polymer material into the mold, wherein the metal insert forms at least a portion of the living hinge; and
- the operation of injecting the polymer material into the mold encapsulates a first portion of the metal insert in the first arm and a second portion of the metal insert in the third arm.

* * * * *